United States Patent
Karapetian et al.

(10) Patent No.: US 11,286,043 B2
(45) Date of Patent: Mar. 29, 2022

(54) NOSE LANDING GEAR ASSEMBLY FOR USE WITH AN AIRCRAFT

(71) Applicant: The Boeing Company, Chicago, IL (US)

(72) Inventors: Michael S. Karapetian, Huntington Beach, CA (US); Hao Lee, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 85 days.

(21) Appl. No.: 16/880,420

(22) Filed: May 21, 2020

(65) Prior Publication Data

US 2021/0362841 A1 Nov. 25, 2021

(51) Int. Cl.
*B64C 25/04* (2006.01)
*B64C 1/20* (2006.01)
*B64C 25/18* (2006.01)
*B64C 25/60* (2006.01)

(52) U.S. Cl.
CPC ............... *B64C 25/04* (2013.01); *B64C 1/20* (2013.01); *B64C 25/18* (2013.01); *B64C 25/60* (2013.01)

(58) Field of Classification Search
CPC ......... B64C 25/04; B64C 25/10; B64C 25/18; B64C 25/20; B64C 25/22; B64C 25/60
See application file for complete search history.

(56) References Cited

U.S. PATENT DOCUMENTS

| 5,100,083 A * | 3/1992 | Large | B64C 25/34 244/102 R |
| 5,337,976 A * | 8/1994 | Derrien | B64C 25/14 244/102 A |
| 6,824,100 B1 * | 11/2004 | Cheetham | B64C 25/20 244/102 R |
| 9,272,775 B2 | 3/2016 | Guering | |
| 2013/0112808 A1 * | 5/2013 | Guering | B64C 25/10 244/102 SS |

(Continued)

FOREIGN PATENT DOCUMENTS

| EP | 2822853 A1 | 1/2015 |
| WO | 2013133839 A1 | 9/2013 |

OTHER PUBLICATIONS

European Extended Search Report and Written Opinion regarding European Patent Application No. 21168011.1 dated Oct. 1, 2021, pp. 9.

*Primary Examiner* — Tye William Abell
(74) *Attorney, Agent, or Firm* — Armstrong Teasdale LLP

(57) ABSTRACT

A nose landing gear assembly includes an oleo strut, a forward brace including a forward brace first end and a forward brace second end. The forward brace first end is pivotably coupled to the nose gear bay of a high wing aircraft about a first pivot axis. The assembly also includes an aft brace including an aft brace first end and an aft brace second end. The aft brace first end is pivotably coupled to the nose gear bay about a second pivot axis, and the aft brace second end is pivotably coupled to the oleo strut. An actuator includes an actuator first end and an actuator second end. The actuator second end is coupled to the nose gear bay and the actuator first end coupled to the forward brace. The actuator is configured to move the nose landing gear assembly between a retracted position and an extended position.

17 Claims, 28 Drawing Sheets

(56) References Cited

U.S. PATENT DOCUMENTS

| | | | |
|---|---|---|---|
| 2013/0134259 A1* | 5/2013 | Lieven | B64C 25/20 |
| | | | 244/102 A |
| 2014/0175223 A1* | 6/2014 | Durand | B64C 1/061 |
| | | | 244/119 |
| 2016/0129502 A1 | 5/2016 | Varetti et al. | |
| 2016/0236796 A1* | 8/2016 | Piroozmandi | B64C 25/34 |
| 2017/0036404 A1 | 2/2017 | Rengers et al. | |
| 2017/0120335 A1 | 5/2017 | DeMuth et al. | |
| 2018/0001423 A1 | 1/2018 | Stevenson et al. | |
| 2019/0144104 A1* | 5/2019 | Fortier | B64C 25/14 |
| | | | 244/102 R |
| 2019/0240773 A1 | 8/2019 | Carter | |
| 2019/0241256 A1* | 8/2019 | Moine | B64C 25/26 |
| 2019/0283867 A1* | 9/2019 | Euzet | B64C 25/26 |

\* cited by examiner

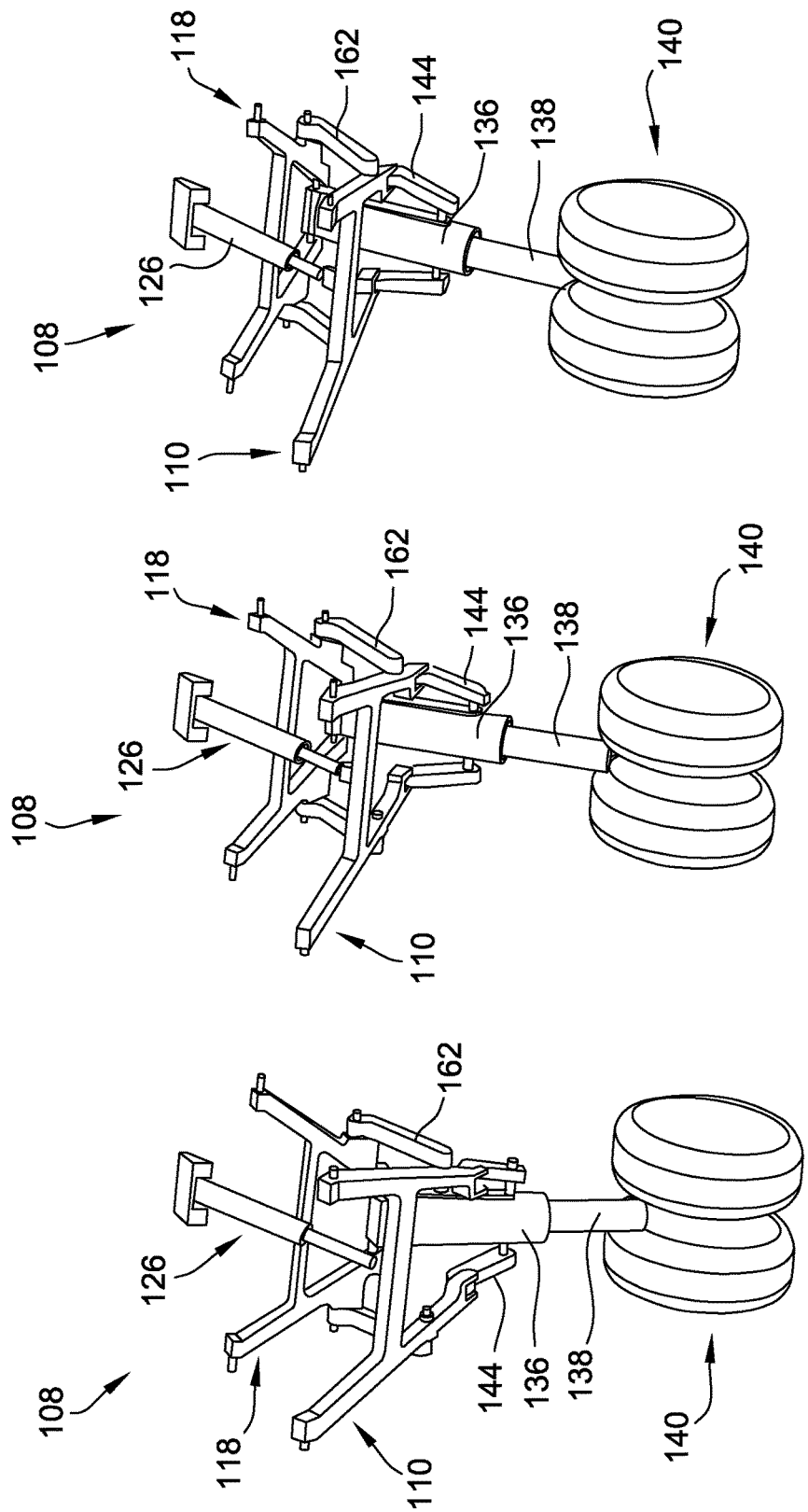

NOSE LANDING GEAR ASSEMBLY FOR USE WITH AN AIRCRAFT

FIELD

The field of the disclosure relates generally to nose-mounted landing gear for an aircraft, and more specifically to a compact nose-mounded landing gear housed in a reduced-volume gear bay.

BACKGROUND

Current known nose landing gears and their stowing mechanism configurations are highly refined based on the aircraft type and function efficiently under multiple operational conditions, such as taxiing, braking, take-off/landing, and retraction/extension. Commercial airliners generally include a passenger area and a luggage area beneath the passenger area. The luggage area on some known aircraft also includes landing gear bays that house the landing gear during flight. However, in aircraft used for the transport of cargo only, the cargo area floor is positioned in as close proximity to the bottom of the aircraft as possible to enable a maximum amount of cargo storage. In such configurations, the available volume for the storage of landing gear is reduced, and the volume of the cargo area is limited by the amount of space needed to house the landing gear during flight.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a nose landing gear assembly for use with a high wing aircraft that defines a nose gear bay is provided. The nose landing gear assembly includes an oleo strut, a forward brace including a forward brace first end and a forward brace second end. The forward brace first end is pivotably coupled to the nose gear bay about a first pivot axis. The nose landing gear assembly also includes an aft brace including an aft brace first end and an aft brace second end. The aft brace first end is pivotably coupled to the nose gear bay about a second pivot axis, and the aft brace second end is pivotably coupled to the oleo strut. An actuator includes an actuator first end and an actuator second end. The actuator second end is coupled to the nose gear bay and the actuator first end coupled to the forward brace. The actuator is configured to selectively move the nose landing gear assembly between, inclusively, a retracted position and an extended position.

In another aspect, an aircraft is provided. The aircraft includes a cargo bay comprising a cargo bay floor, a nose gear bay positioned below the cargo bay floor; and a nose landing gear assembly selectively positioned within the nose gear bay. The nose landing gear assembly includes an oleo strut, a forward brace including a forward brace first end and a forward brace second end. The forward brace first end is pivotably coupled to the nose gear bay about a first pivot axis. The nose landing gear assembly also includes an aft brace including an aft brace first end and an aft brace second end. The aft brace first end is pivotably coupled to the nose gear bay about a second pivot axis, and the aft brace second end is pivotably coupled to the oleo strut. An actuator includes an actuator first end and an actuator second end. The actuator second end is coupled to the nose gear bay and the actuator first end coupled to the forward brace. The actuator is configured to selectively move the nose landing gear assembly between, inclusively, a retracted position and an extended position.

In yet another aspect, a method of assembling a nose gear assembly for use with a high wing aircraft is provided. The high wing aircraft defines a nose gear bay, wherein the nose gear assembly includes an oleo strut, a forward brace, an aft brace, and an actuator. The method includes pivotably coupling a first end of the forward brace to the nose gear bay about a first pivot axis and pivotably coupling a first end of the aft brace to the nose gear bay about a second pivot axis. The method also includes pivotably coupling a second end of the aft brace to the oleo strut, coupling a first end of the actuator to the nose gear bay, coupling a second end of the actuator to the forward brace. The actuator is configured to selectively move the nose landing gear assembly between, inclusively, a retracted position and an extended position.

BRIEF DESCRIPTION OF THE DRAWINGS

FIGS. 9A-9F are perspective views of the nose landing gear assembly illustrated in FIG. 2 moving from the extended position to a retracted position;

Figure 1:
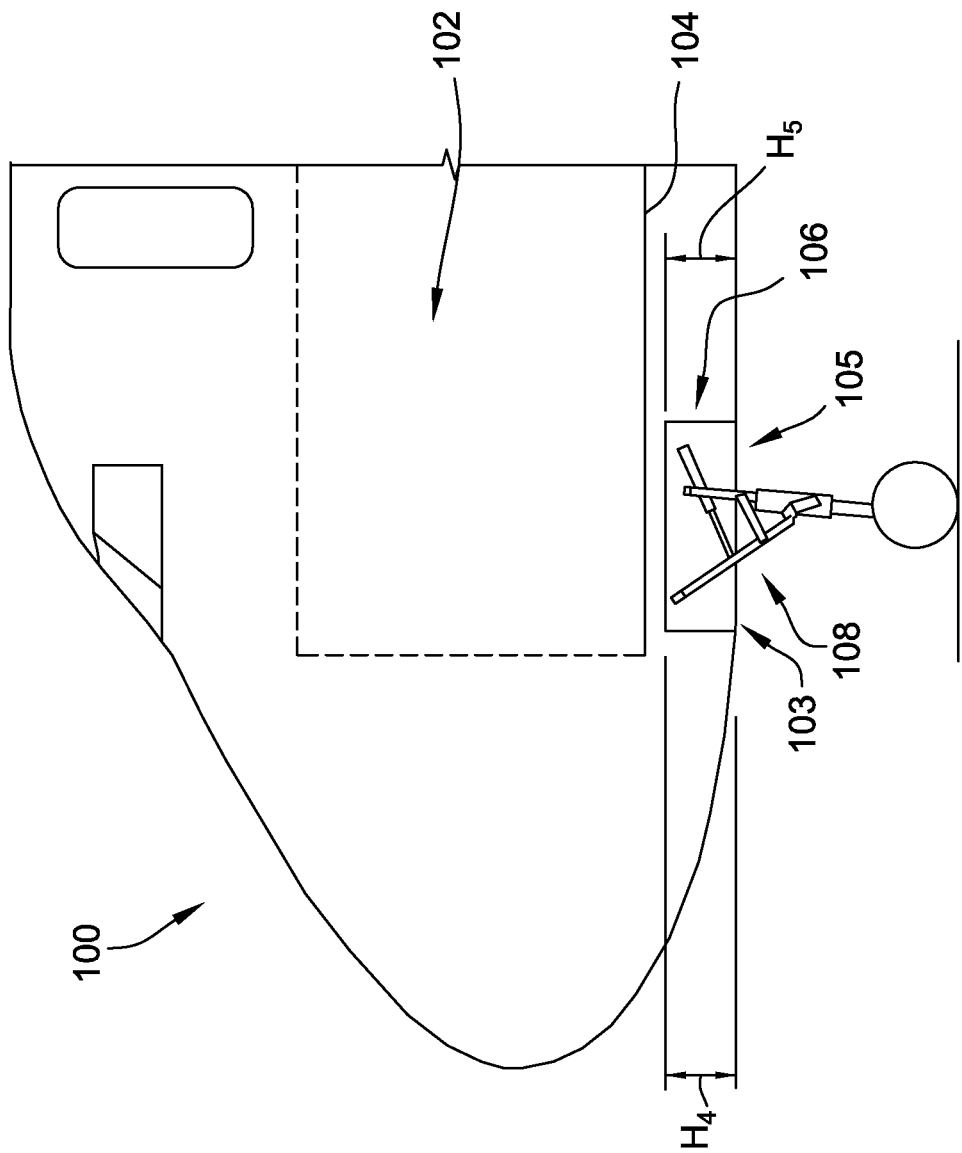
FIG. 1 is a schematic diagram of an exemplary aircraft with an exemplary nose landing gear assembly.

Corresponding reference characters indicate corresponding parts throughout the several views of the drawings. Although specific features of various examples may be shown in some drawings and not in others, this is for convenience only. Any feature of any drawing may be referenced and/or claimed in combination with any feature of any other drawing.

DETAILED DESCRIPTION

The implementations described herein relate to nose-mounted landing gear for an aircraft, and more specifically to a compact nose-mounded landing gear housed in a reduced-volume gear bay. More specifically, in the exemplary implementation, nose-mounted landing gear assembly includes an oleo strut, a forward brace including a forward brace first end and a forward brace second end. The forward brace first end is pivotably coupled to the nose gear bay of a high wing aircraft about a first pivot axis. The nose-mounted landing gear assembly also includes an aft brace having an aft brace first end and an aft brace second end. The aft brace first end is pivotably coupled to the nose gear bay about a second pivot axis, and the aft brace second end is pivotably coupled to the oleo strut. An actuator includes an actuator first end and an actuator second end. The actuator second end is coupled to the nose gear bay and the actuator first end coupled to the forward brace. The actuator is configured to move the nose landing gear assembly between a retracted position and an extended position.

The assemblies and methods described herein facilitate folding a nose gear assembly into a more compact configuration in order to allow storage in a reduced volume nose gear bay. Generally, the nose gear assembly described herein is for use with a cargo aircraft having no passenger compartment and an enlarged cargo bay. In such an aircraft, the cargo bay floor is positioned in as close proximity to the bottom of the aircraft as possible to enable a maximum amount of cargo storage. As such, the available volume for the storage of the nose landing gear assembly is reduced. The nose landing gear assembly described herein allows for a retracted configuration that occupies only a small percentage of the space required when in the extended configuration, and so is able to be stored in a relatively smaller nose gear bay volume. As a result, the cargo bay is made to be larger than known cargo aircraft to enable the transport of a larger volume of cargo.

Figure 2:
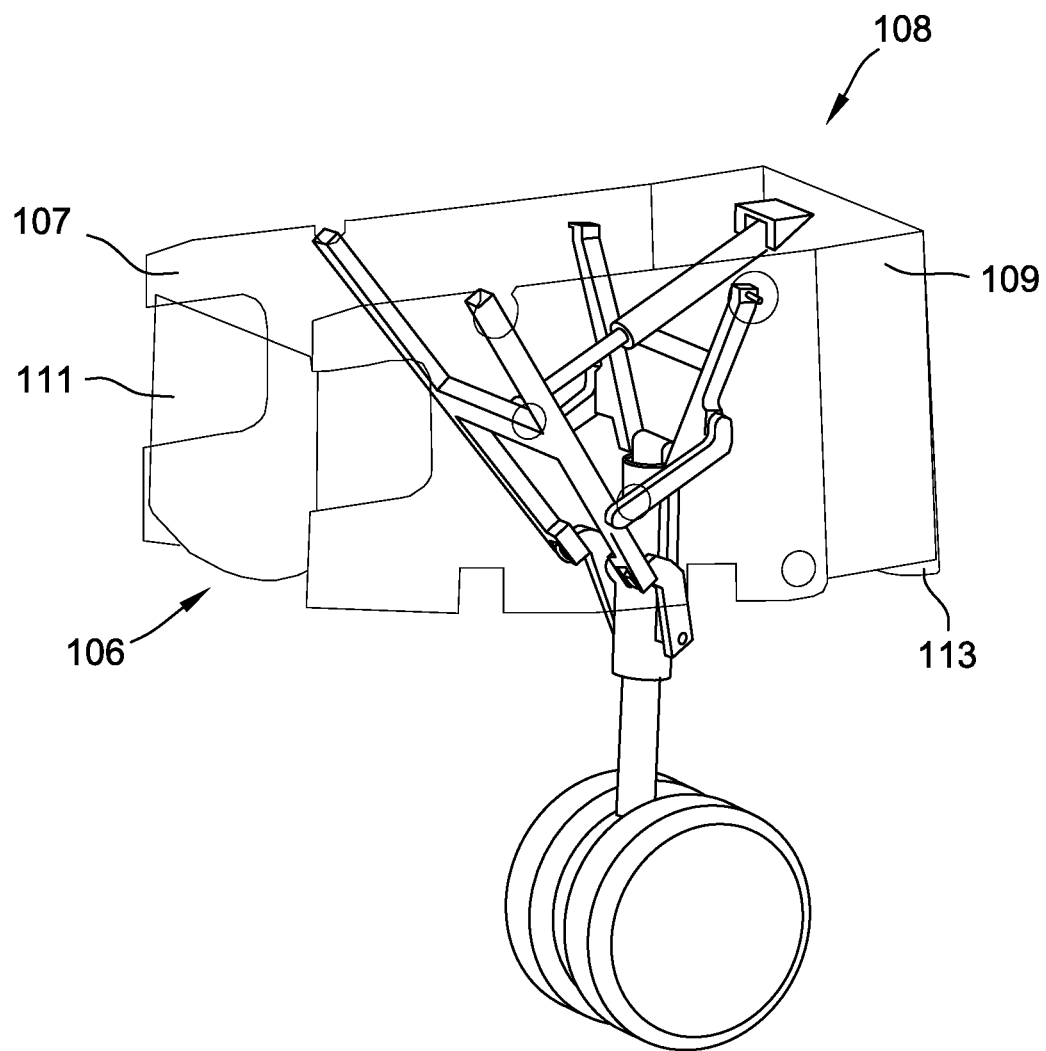
FIG. 2 is a schematic diagram of the nose landing gear assembly illustrated in FIG. 1 in a gear bay of the exemplary aircraft.

FIG. 1 is a schematic diagram of an aircraft 100. In the exemplary embodiment, aircraft 100 is a high wing cargo aircraft that includes a cargo bay 102 and a cargo bay floor 104. Furthermore, a nose gear bay 106 is positioned below the cargo bay floor 104 and selectively houses a nose gear assembly 108 therein. FIG. 2 is a schematic diagram of the nose landing gear assembly 108 positioned in the nose gear bay 106. The configuration of the aircraft 100 offers a limited volume beneath the cargo bay floor 104 to stow the nose gear assembly 108. As described herein, nose gear assembly 108 includes a folding mechanism that allows for support trunnions to be placed in much closer proximity to one another thus allowing for a much more compact nose gear bay 106. Specifically, as shown in FIG. 2, nose gear bay 106 includes a first side panel 107, a second side panel 109, a forward panel 111 extending between side panel 107 and 109, and an aft panel 113 extending between side panel 107 and 109. Panels 107, 109, 111, and 113 define the interior volume in which nose gear assembly 108 is stored during flight.

Figure 3:
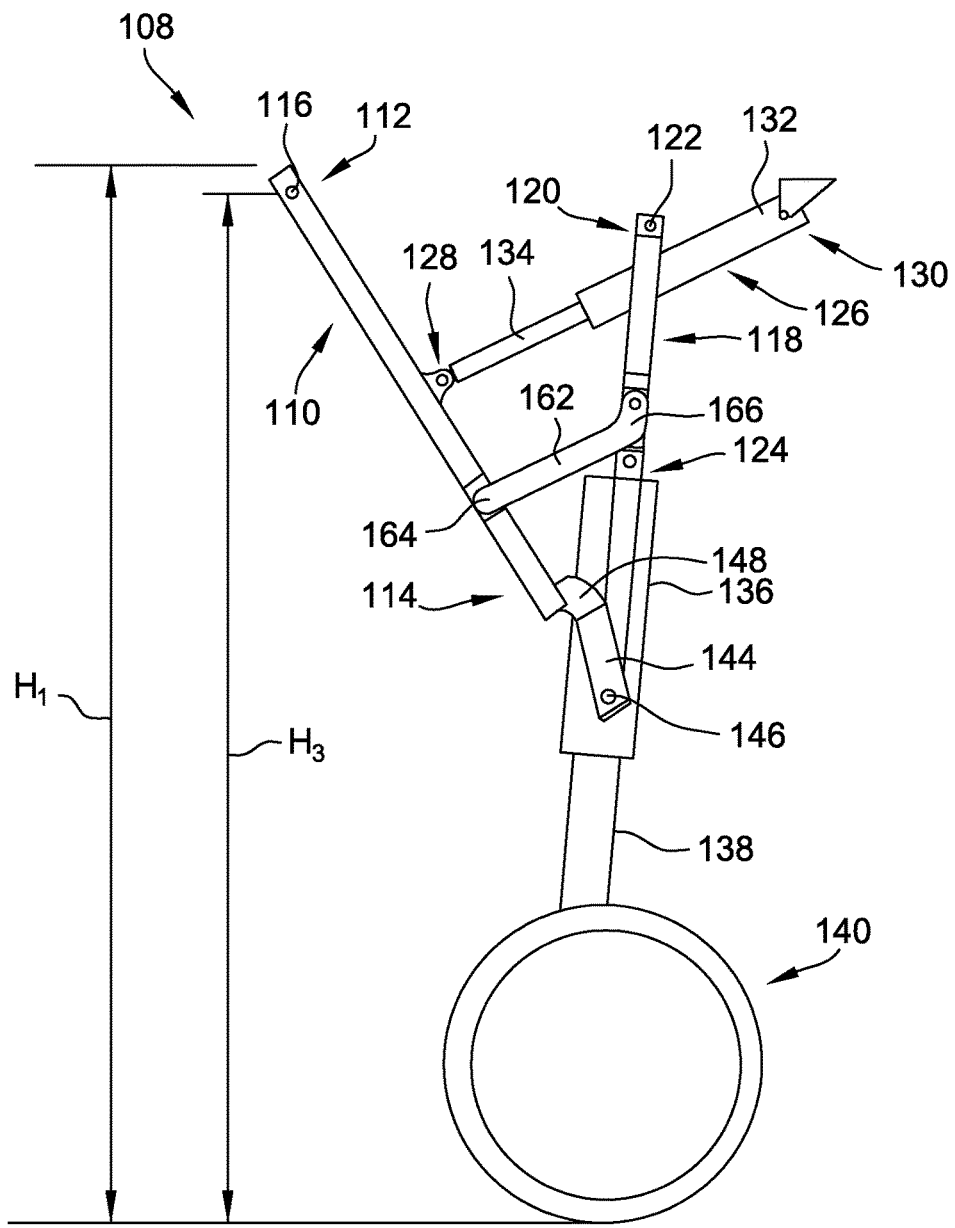
FIG. 3 is a side view of the nose landing gear assembly illustrated in FIG. 2 in an extended position.
Figure 4:
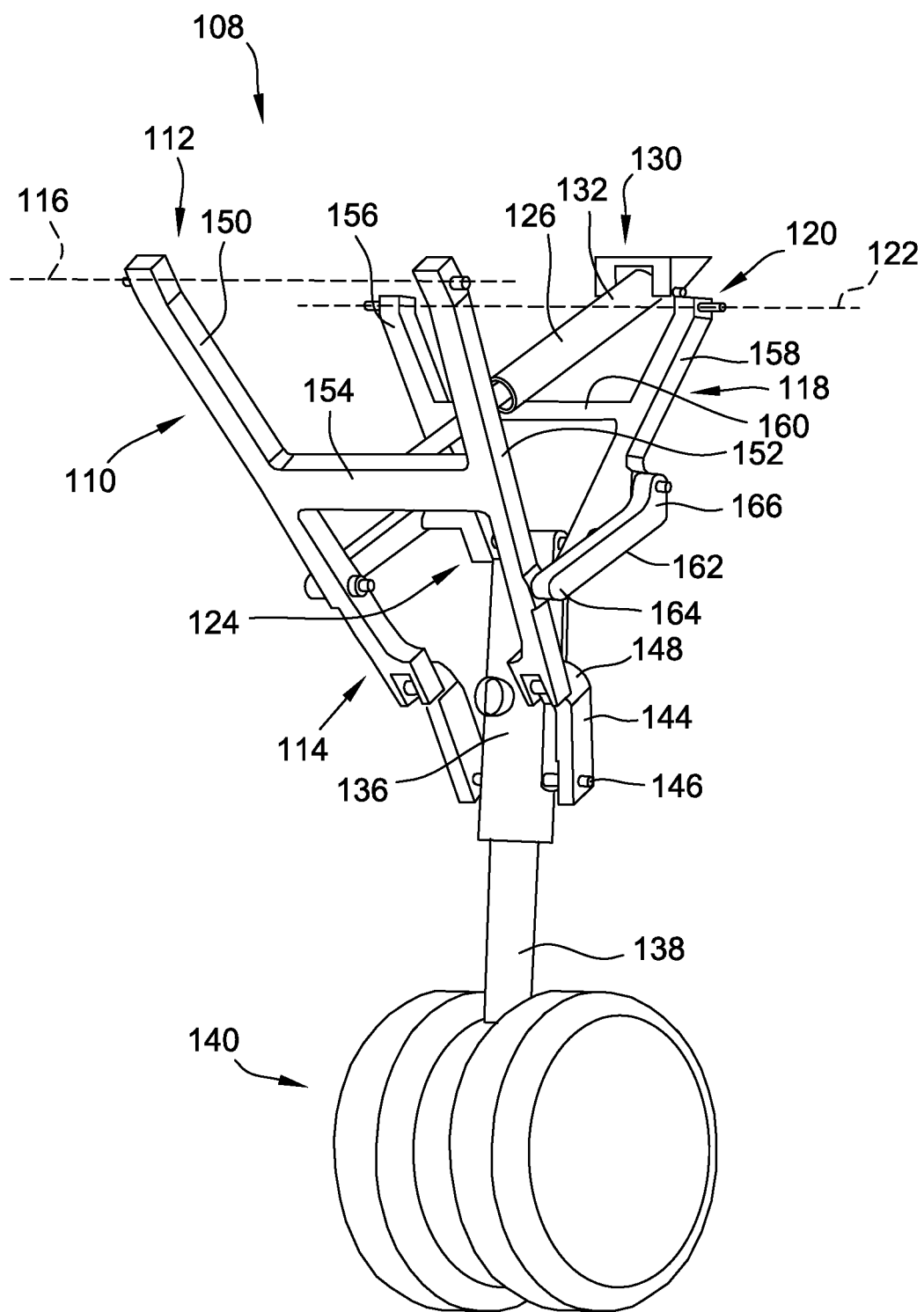
FIG. 4 is a perspective view of the nose landing gear assembly illustrated in FIG. 2 in the extended position.
Figure 5:
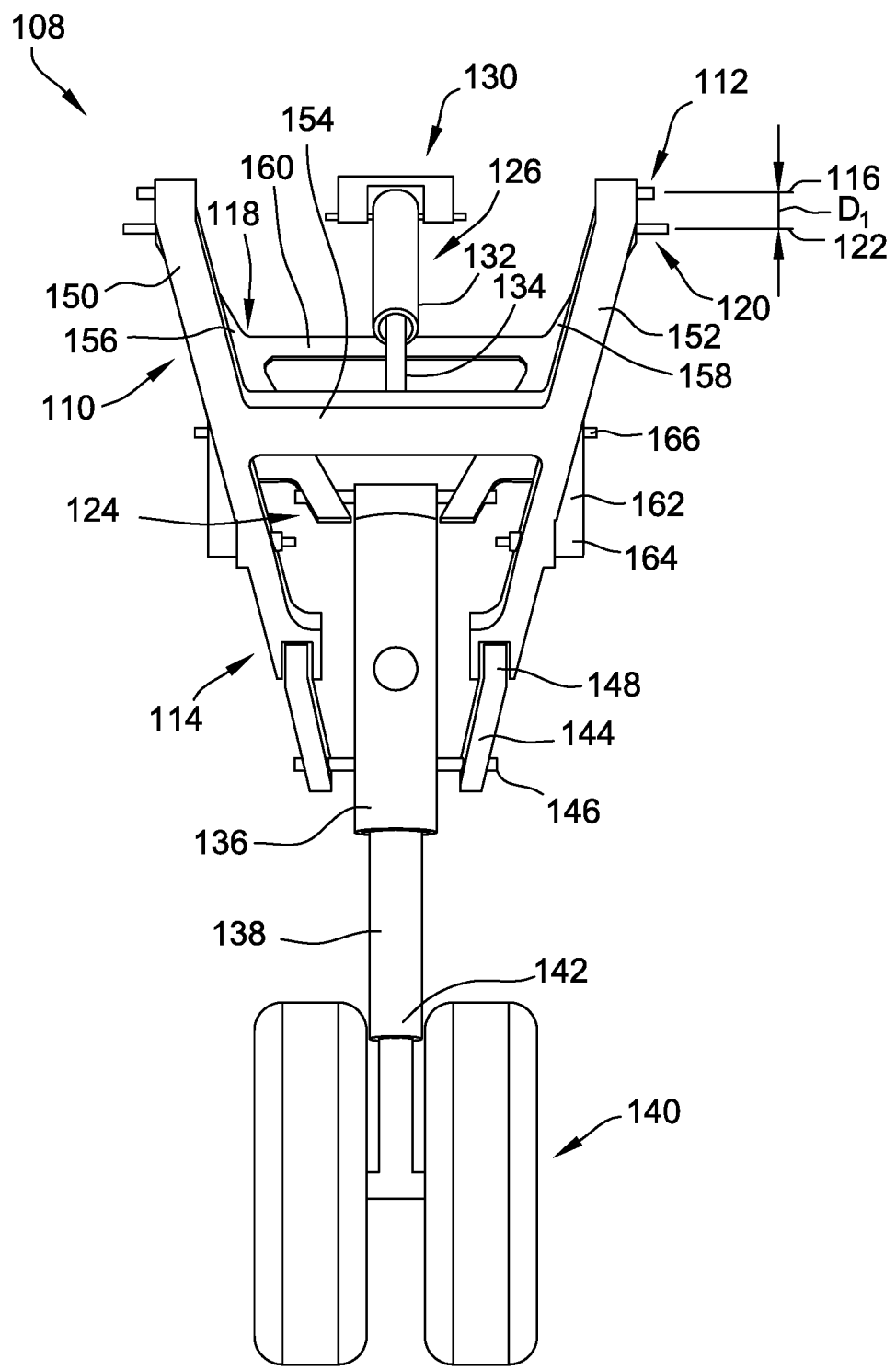
FIG. 5 is a front view of the nose landing gear assembly illustrated in FIG. 2 in the extended position.
Figure 6:
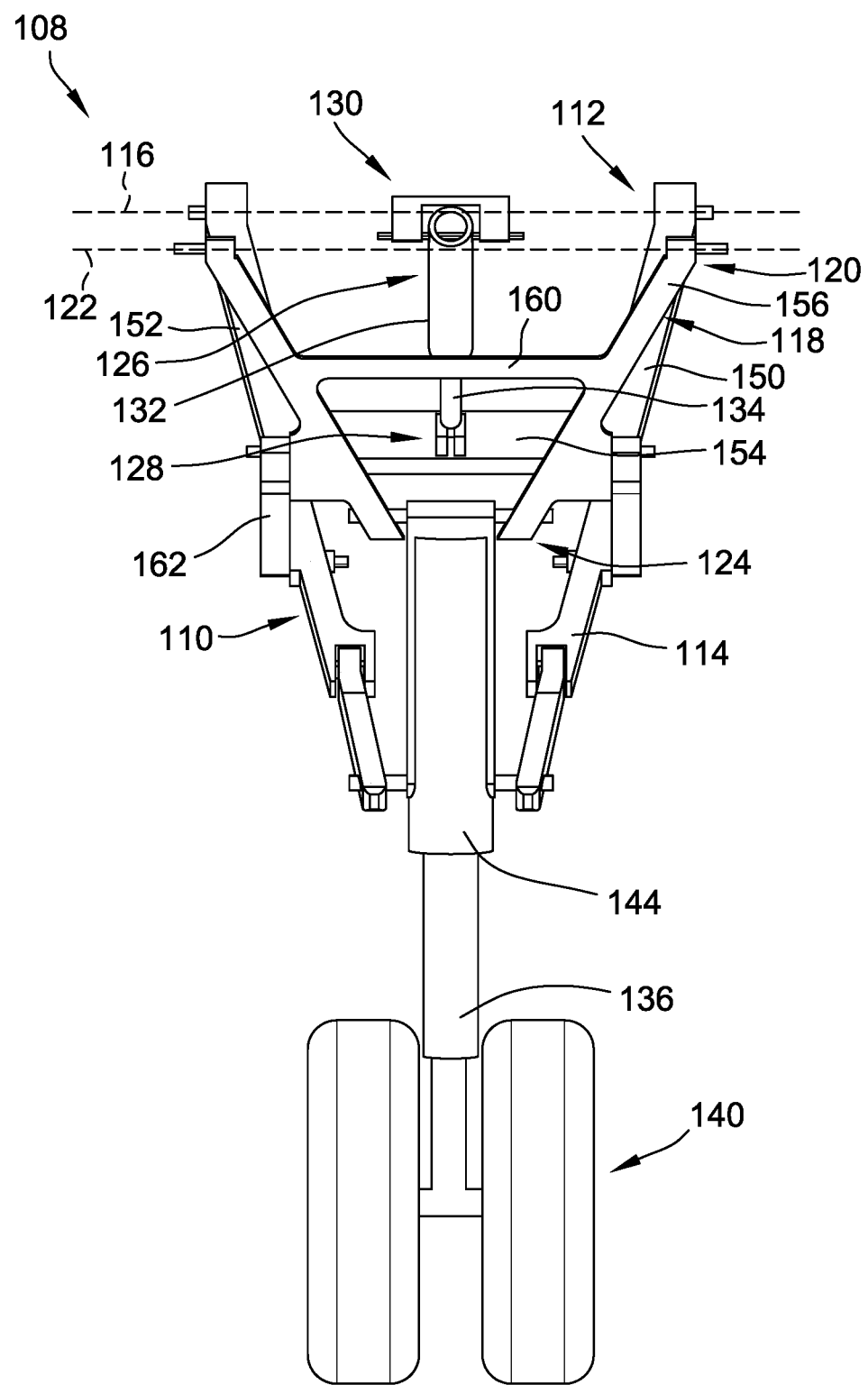
FIG. 6 is a rear view of the nose landing gear assembly illustrated in FIG. 2 in the extended position.
Figure 7:
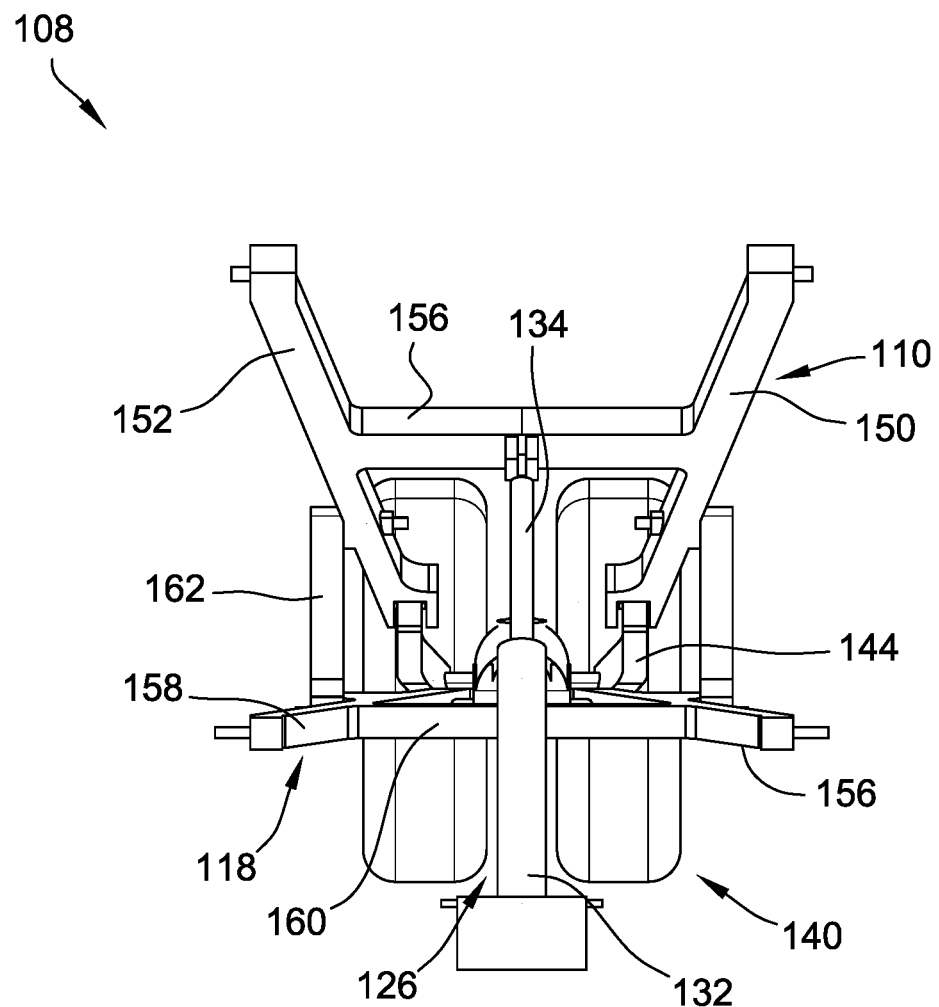
FIG. 7 is a top view of the nose landing gear assembly illustrated in FIG. 2 in the extended position.
Figure 8:
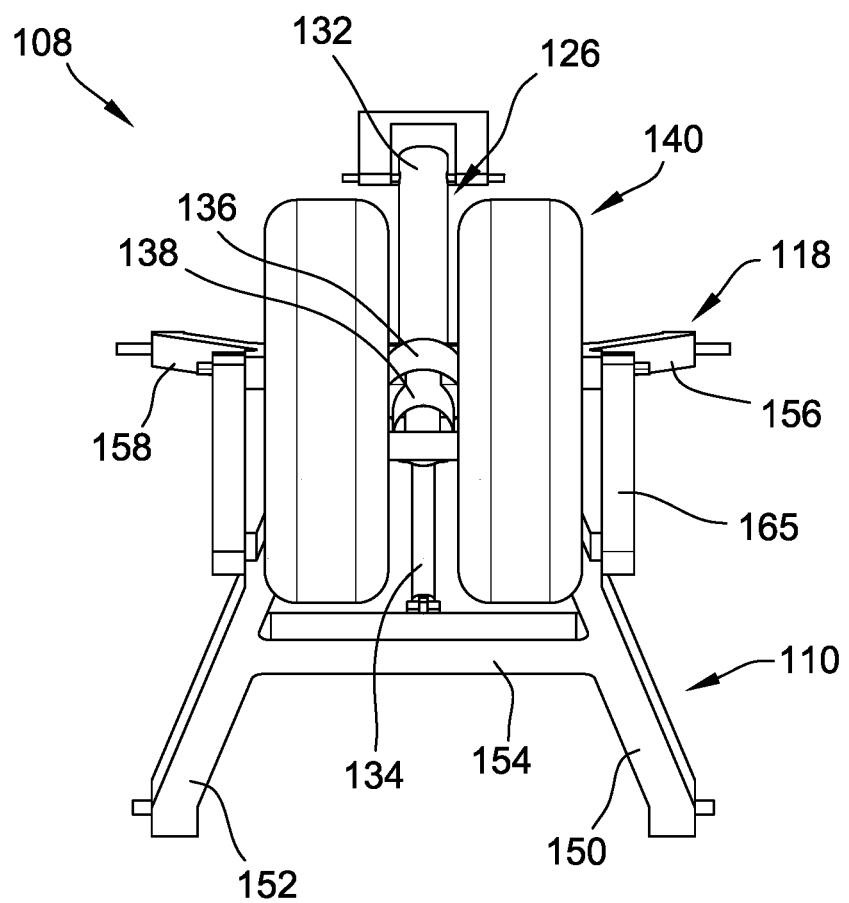
FIG. 8 is a bottom view of the nose landing gear assembly illustrated in FIG. 2 in the extended position.
Figure 9F:
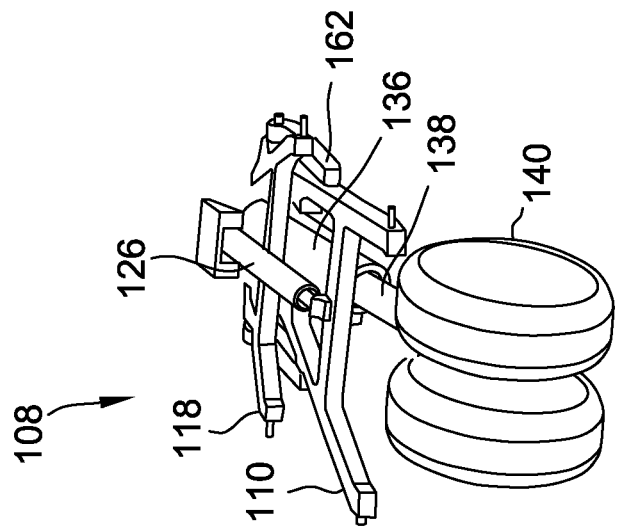
Figure 9E:
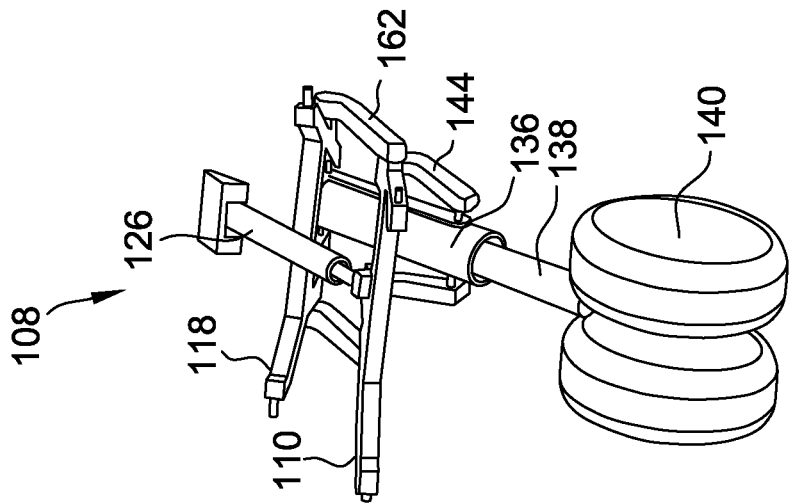
Figure 9D:
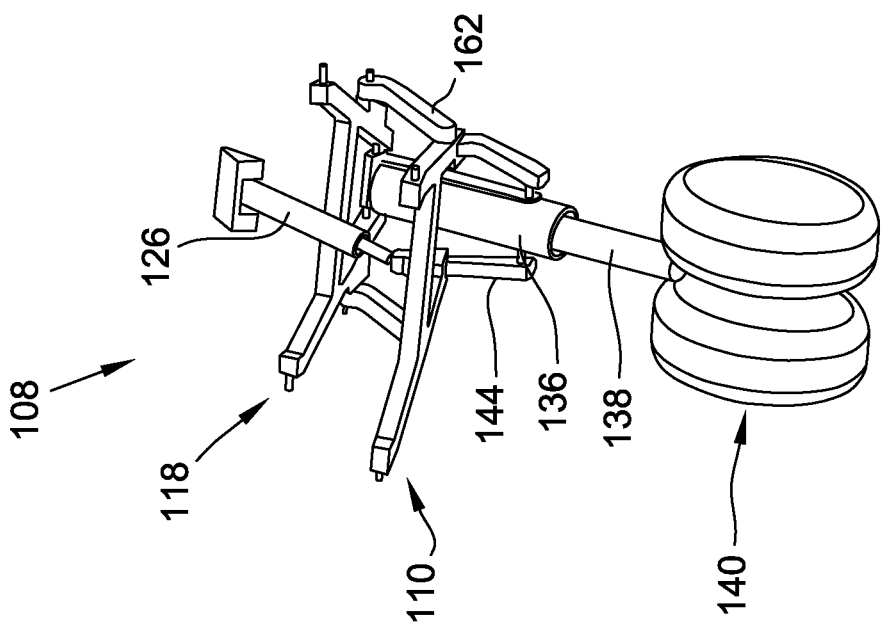

FIG. 3 is a side view of the nose landing gear assembly 108 an extended position, FIG. 4 is a perspective view of the nose landing gear assembly 108 in the extended position, and FIG. 5 a front view of the nose landing gear assembly 108 in the extended position. FIG. 6 is a rear view of the nose landing gear assembly 108 in the extended position, FIG. 7 is a top view of the nose landing gear assembly 108 in the extended position, and FIG. 8 is a bottom view of the nose landing gear assembly 108 in the extended position.

In the exemplary embodiment, nose gear assembly 108 includes a forward brace 110 having a forward brace first end 112 and a forward brace second end 114. Forward brace first end 112 is coupled to nose gear bay 106 about a first pivot axis 116. Specifically, forward brace 110 is pivotally coupled to side panels 107 and 109 of nose gear bay 106 at first pivot axis 116. Nose gear assembly 108 also includes an aft brace 118 having an aft brace first end 120 and an aft brace second end 124. Aft brace first end 120 is coupled to nose gear bay 106 about a second pivot axis 122. Specifically, aft brace 118 is pivotally coupled to side panels 107 and 109 of nose gear bay 106 at second pivot axis 122. As best shown in FIG. 5, first pivot axis 116 is positioned higher within nose gear bay 106 than second pivot axis 122 such that first pivot axis 116 and second pivot axis 122 are vertically offset by a distance D1 of between approximately 1.50 inches and approximately 3.50 inches. More specifically, first pivot axis 116 and second pivot axis 122 are vertically offset by a distance D1 of approximately 2.50 inches Such a relatively small offset distance enables nose gear assembly 108 to fold into the smaller volume of nose gear bay 106.

In the exemplary embodiment, nose gear assembly 108 also includes an actuator 126 having an actuator first end 128 and an actuator second end 130. More specifically, actuator includes an outer cylinder 132 having second end 130 and an inner cylinder 134 having first end 128. Inner cylinder 134 is telescopically coupled to outer cylinder 132 to increase/decrease the distance between ends 128 and 130. Actuator first end 128 is coupled to forward brace 110 and actuator second end 130 is coupled to nose gear bay 106. As described herein, actuator 126 is configured to selectively move nose landing gear assembly 108 between, inclusively, a retracted position and the extended position.

As best shown in FIGS. 3 and 5, nose gear assembly 108 also includes an oleo strut 136 pivotally coupled to aft brace second end 124. A shock strut 138 is telescopically coupled to oleo strut 136, and a wheel assembly 140 is coupled to a distal end 142 of shock strut 138. Shock strut 138 is configured to retract into oleo strut 136 when nose gear assembly 108 is in the retracted configuration. Additionally, shock strut 138 is configured to extend from oleo strut 136 when nose gear assembly 108 is in the expanded configuration.

In the exemplary embodiment, a pair of lower links 144 are coupled between oleo strut 136 and forward brace 110. More specifically, lower links 144 include a lower link first end 146 pivotally coupled to oleo strut 136 and a lower link second end 148 pivotally coupled to forward brace second end 114. Lower links 144 enable nose gear assembly 108 to collapse into a small volume to fit inside the available volume of nose gear bay 106.

As best shown in FIGS. 4 and 5, forward brace 110 includes a forward brace first leg 150, a forward brace second leg 152, and a forward brace crossbeam 154 coupled to and extending between legs 150 and 152. In the exemplary embodiment, legs 150 and 152 are obliquely oriented with respect to each other such that a width of forward brace 110 tapers narrower from forward brace first end 112 to forward brace second end 114. Forward brace crossbeam 154 is positioned approximately midway between forward brace first end 112 and forward brace second end 114, and actuator first end 128 is coupled to forward brace crossbeam 154. In operation, actuator 126 pulls forward brace 110 to facilitate transitioning nose gear assembly 108 from the extended position to the retracted position. Specifically, actuator 126 pulls forward brace crossbeam 154 to cause forward brace second end 114 to move towards actuator second end 130.

Similarly, in the exemplary embodiment, aft brace 118 includes an aft brace first leg 156, an aft brace second leg 158, and an aft brace crossbeam 160 coupled to and extending between legs 156 and 158. In the exemplary embodiment, legs 156 and 158 are obliquely oriented with respect to each other such that a width of aft brace 118 tapers narrower from aft brace first end 120 to aft brace second end 124. Aft brace crossbeam 160 is positioned approximately midway between aft brace first end 120 and aft brace second end 124. In such a configuration, actuator outer cylinder 132 extends between, and is spaced from, first ends 120 of aft brace first leg 156 and aft brace second leg 158.

In the exemplary embodiment, nose gear assembly 108 also includes a pair of side links 162 coupled to and between forward brace 110 and aft brace 118. Each side link 162 incudes a side link first end 164 coupled to forward brace 110 and positioned between forward brace crossbeam 154 and forward brace second end 114. Each side link 162 also includes a side link second end 166 coupled to aft brace 118 and positioned between aft brace crossbeam 160 and aft brace second end 124.

As best shown in FIGS. 3 and 5, forward brace 110 is larger than aft brace 118. More specifically, in the exemplary embodiment, legs 150 and 152 of forward brace 110 are longer than legs 156 and 158 of aft brace 118. Additionally, first ends 112 of legs 150 and 152 of forward brace 110 are spaced apart a distance similar to first ends 120 of legs 156 and 158 of aft brace 118. However, second ends 124 of legs 156 and 158 of aft brace 118 are positioned closer to each other than second ends 114 of legs 150 and 152 of forward brace 110. As such, legs 156 and 158 of aft brace 118 are oriented more obliquely with respect to each other than legs 150 and 152 of forward brace 110. Furthermore, as shown in FIG. 3, when nose gear assembly 108 is in the extended position, aft brace 118 is aligned with oleo strut 136 and shock strut 138, all of which are obliquely oriented with respect to a vertical plane perpendicular to a ground surface. Additionally, in the extended position, side links 162 are oriented substantially parallel to outer cylinder 132 and inner cylinder 134.

FIGS. 9A-9F are perspective views of nose landing gear assembly 108 moving from the extended position to a retracted position. In the exemplary embodiment, inner cylinder 134 of actuator 126 retracts into outer cylinder 132, which causes first end 112 of forward brace 110 to pivot about first pivot axis 116 and moves second end 114 of forward brace 110 aftward and upward toward nose gear bay 106. As second end 114 of forward brace 110 moves aftward, side links 162 push second end 124 of aft brace 118 aftward and upward as well. Furthermore, as second end 114 of forward brace 110 moves aftward, lower links 144 pivot with respect to forward brace 110. Specifically, second end 114 of forward brace 110 pushes second end 148 of lower links 144 aftward. Furthermore, as second end 124 of aft brace 118 moves aftward, the top end of oleo strut 136 pivots with respect to second end 124, and lower links 144 begin to raise oleo strut 136, shock strut 138 and wheels 140 toward nose gear bay 106.

Figure 10:
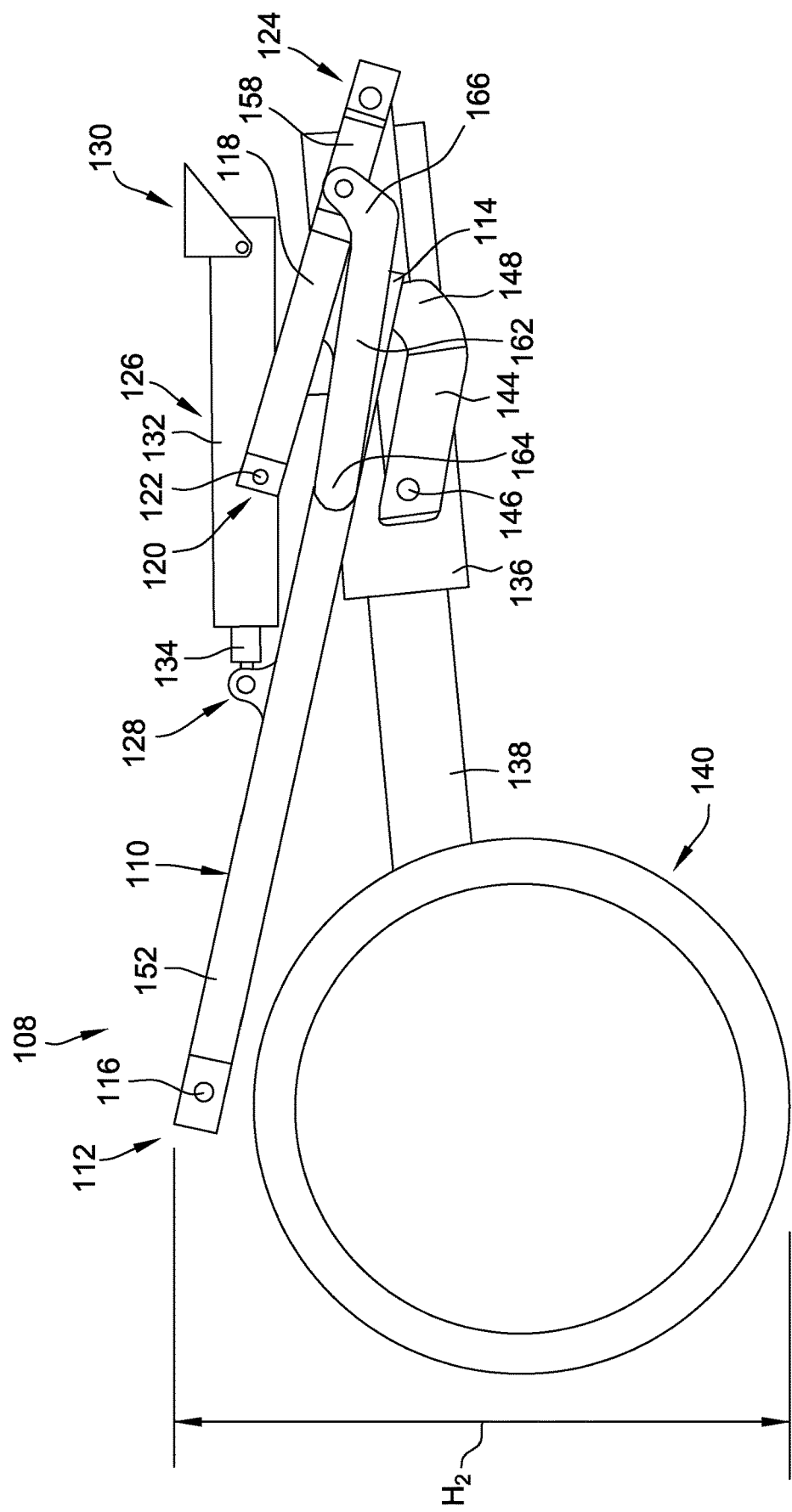
FIG. 10 is a side view of the nose landing gear assembly illustrated in FIG. 2 in the retracted position.
Figure 11:
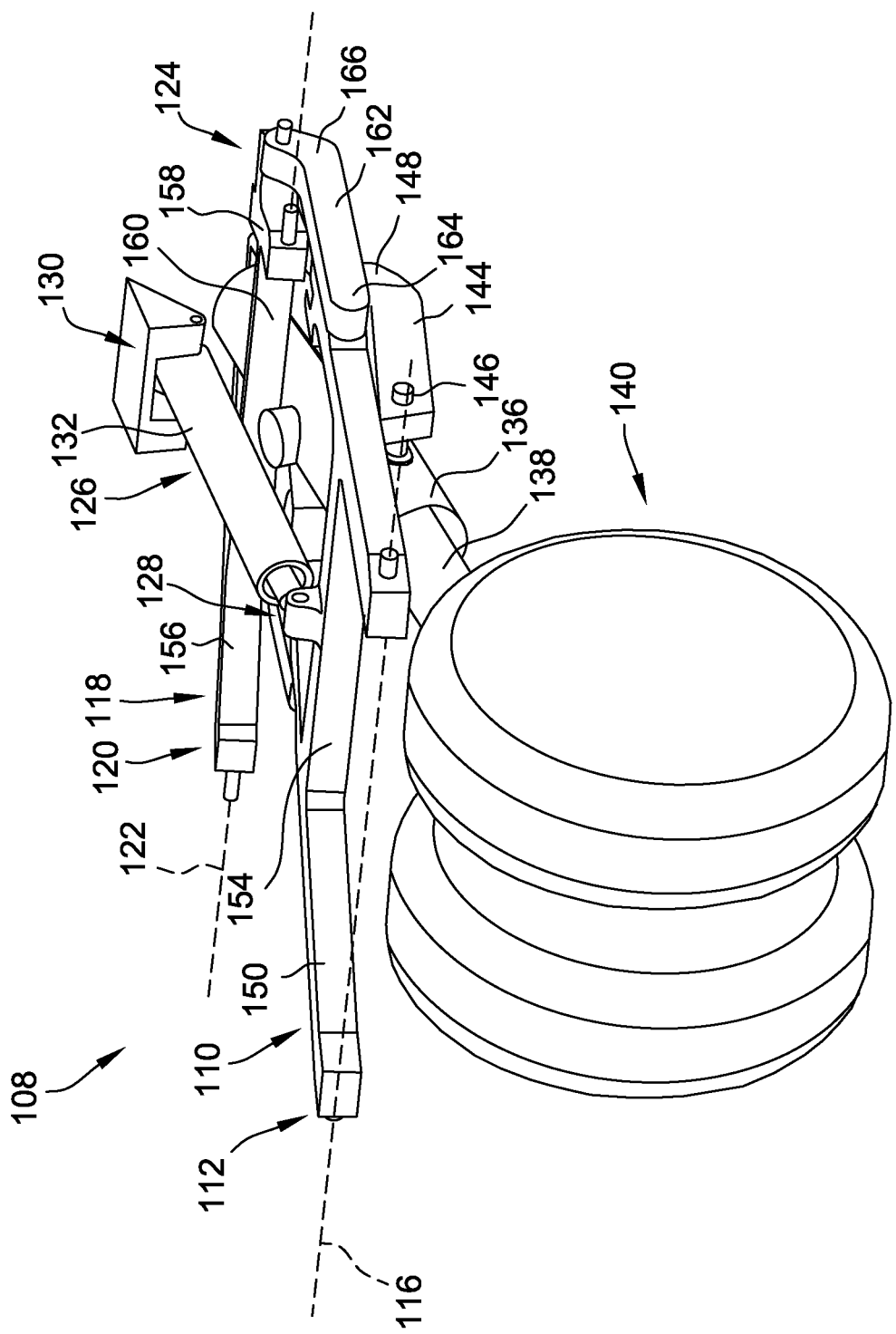
FIG. 11 is a perspective view of the nose landing gear assembly illustrated in FIG. 2 in the retracted position.
Figure 12:
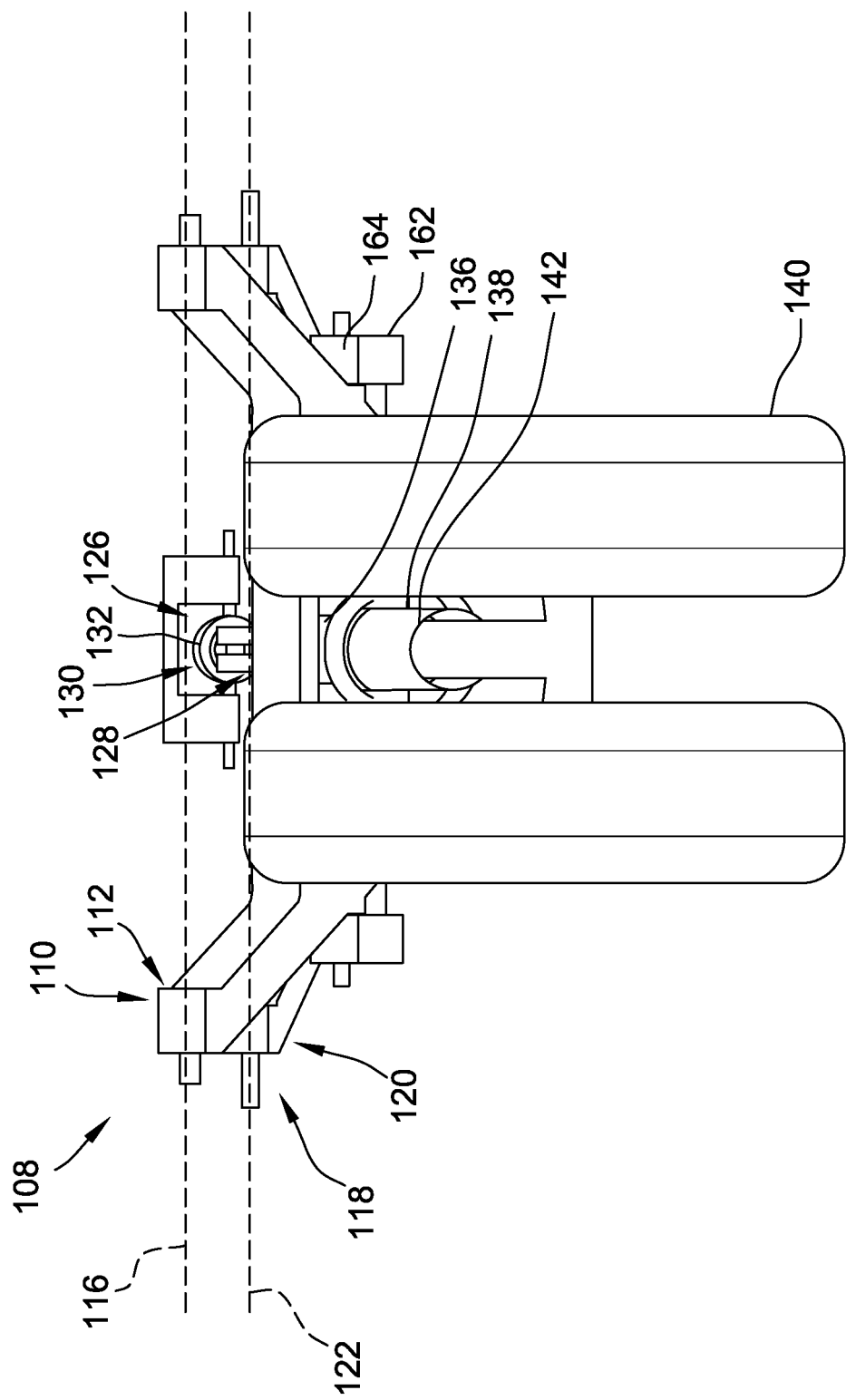
FIG. 12 is a front view of the nose landing gear assembly illustrated in FIG. 2 in the retracted position.
Figure 13:
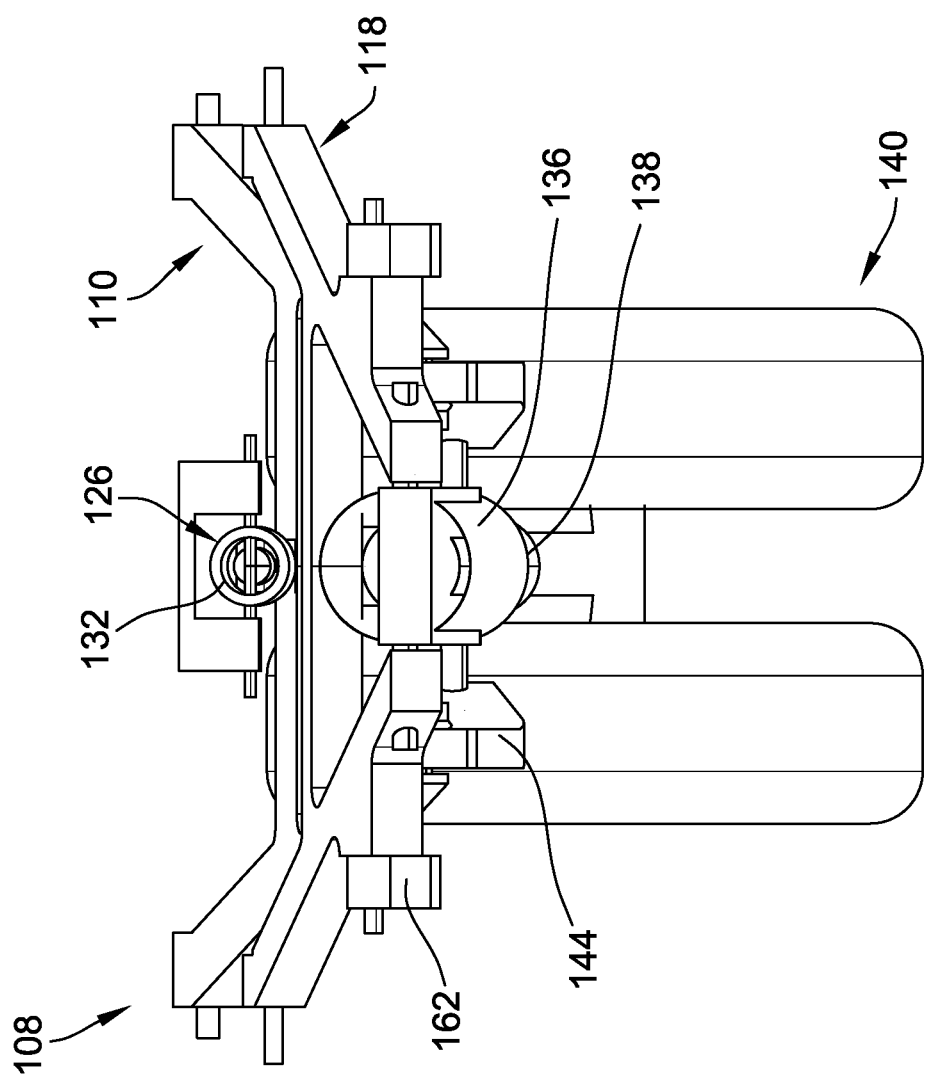
FIG. 13 is a rear view of the nose landing gear assembly illustrated in FIG. 2 in the retracted position.
Figure 14:
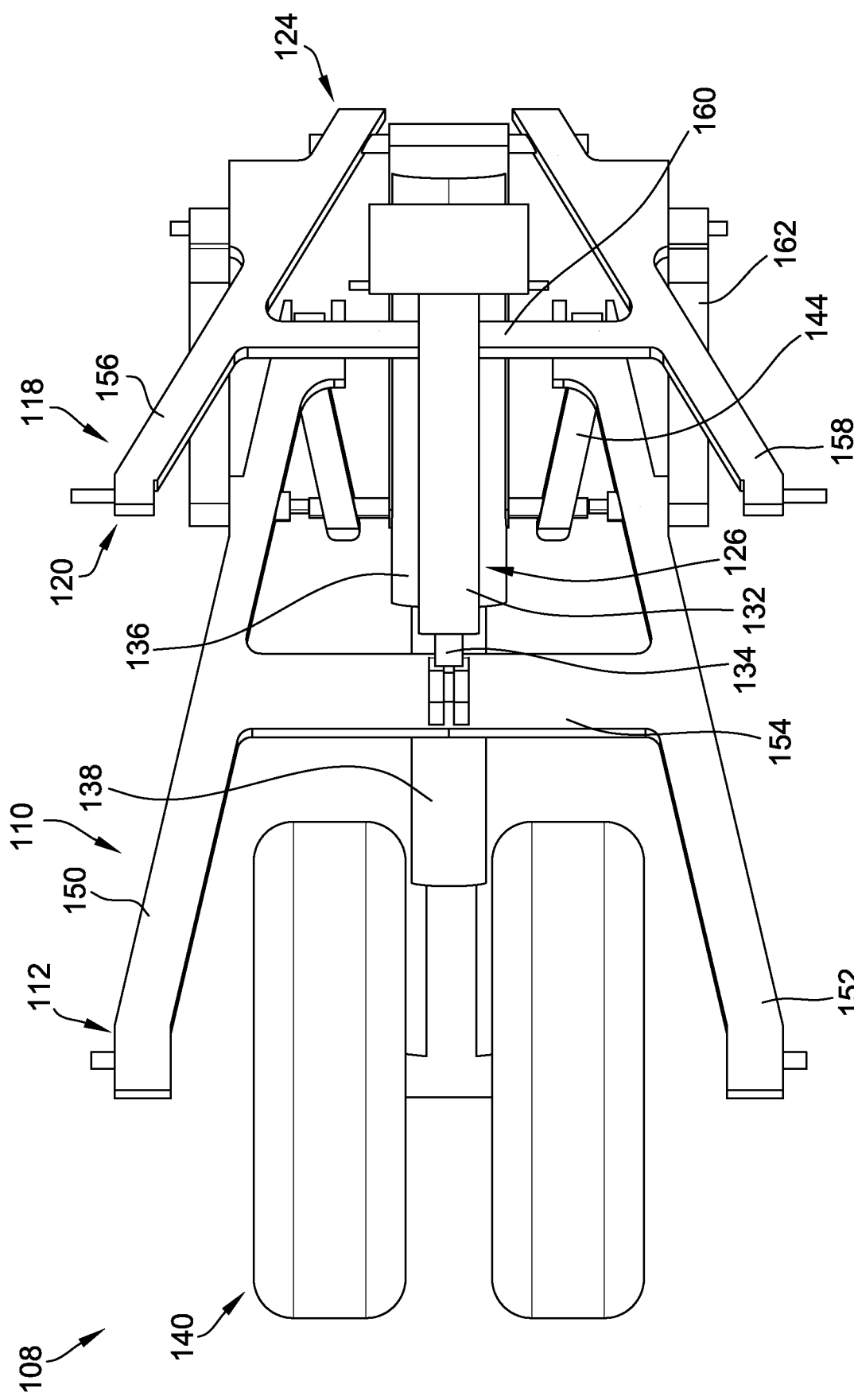
FIG. 14 is a top view of the nose landing gear assembly illustrated in FIG. 2 in the retracted position.
Figure 15:
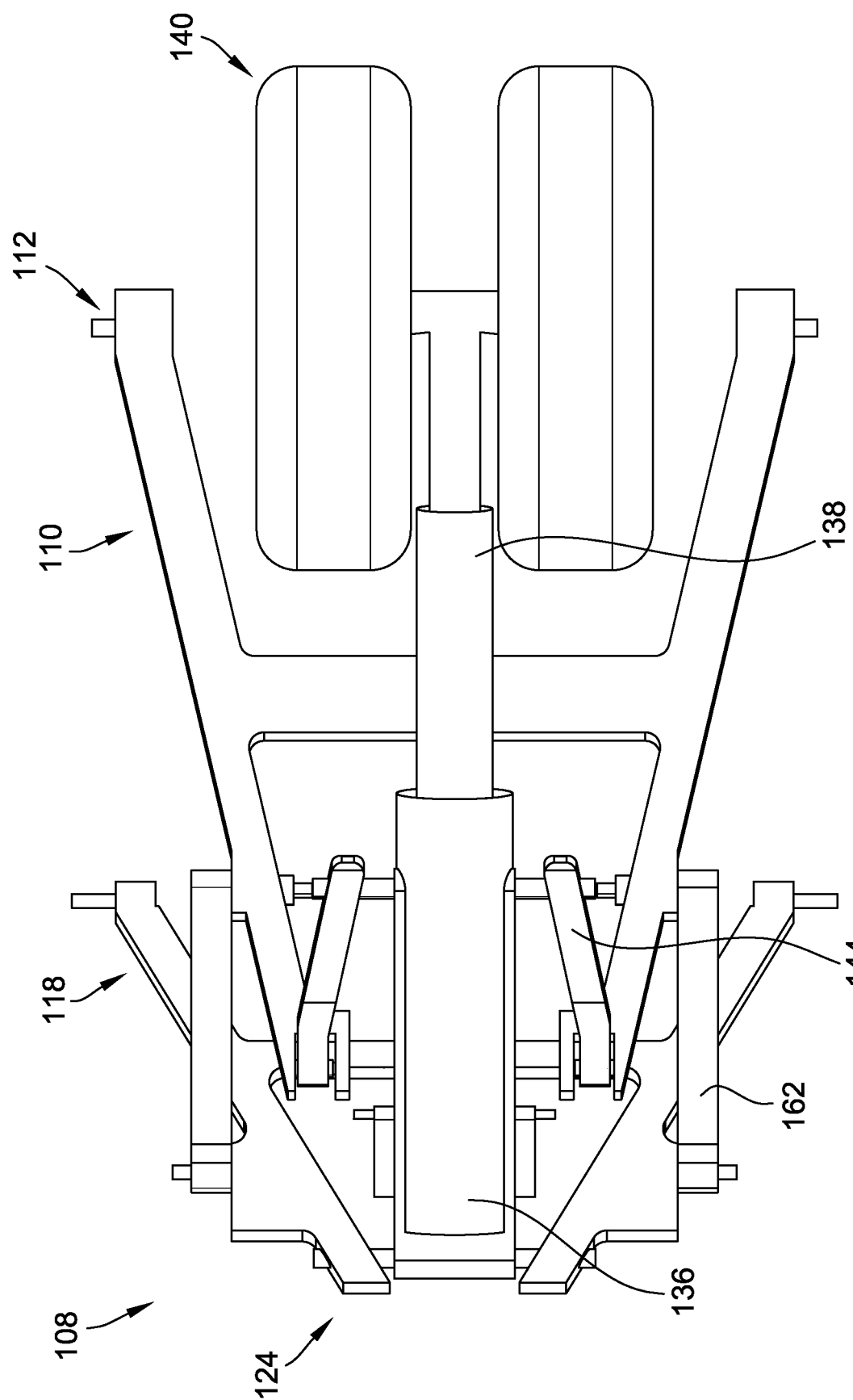
FIG. 15 is a bottom view of the nose landing gear assembly illustrated in FIG. 2 in the retracted position.
Figure 16:
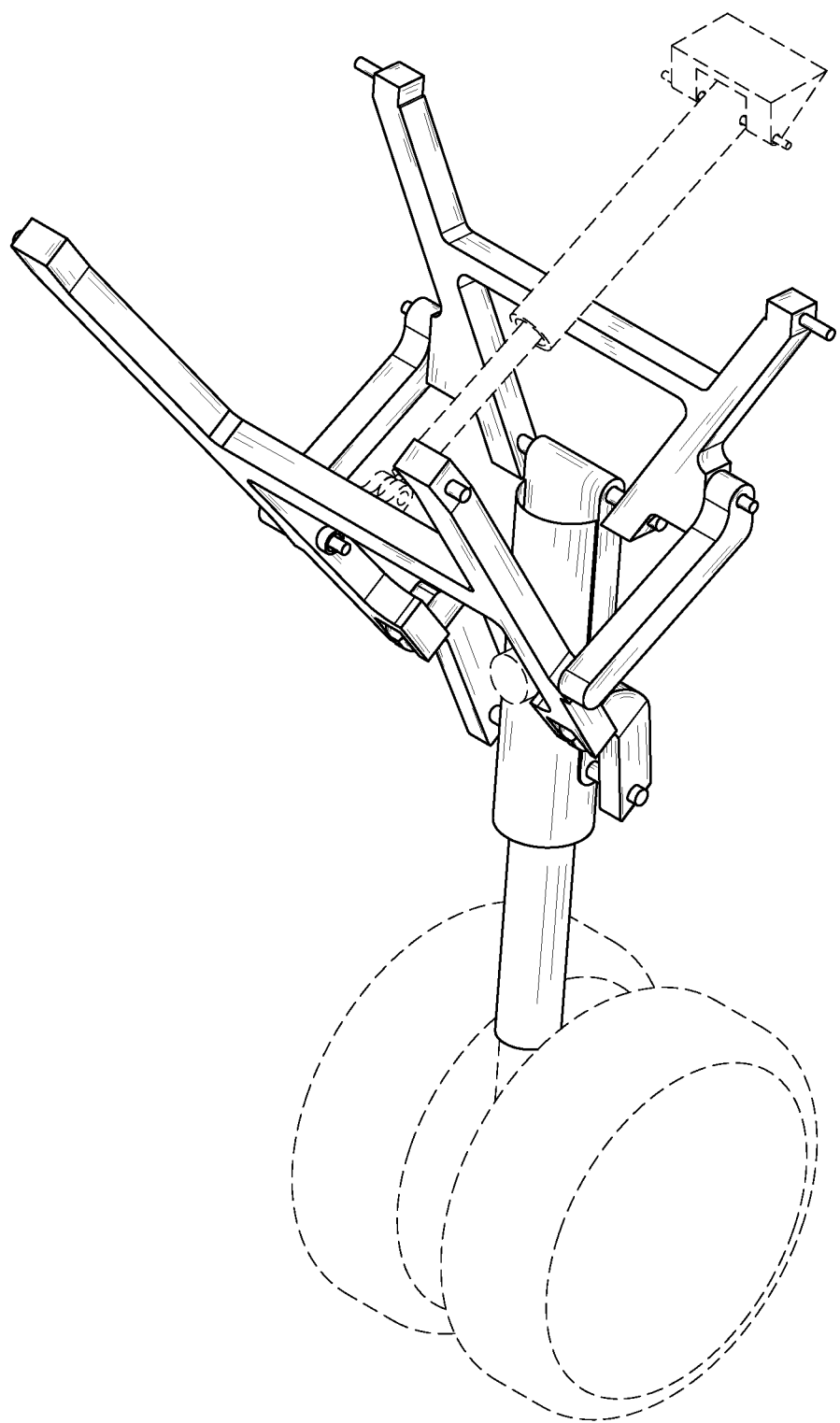
FIG. 16 is a front perspective view of an exemplary nose landing gear assembly in an extended position.
Figure 17:
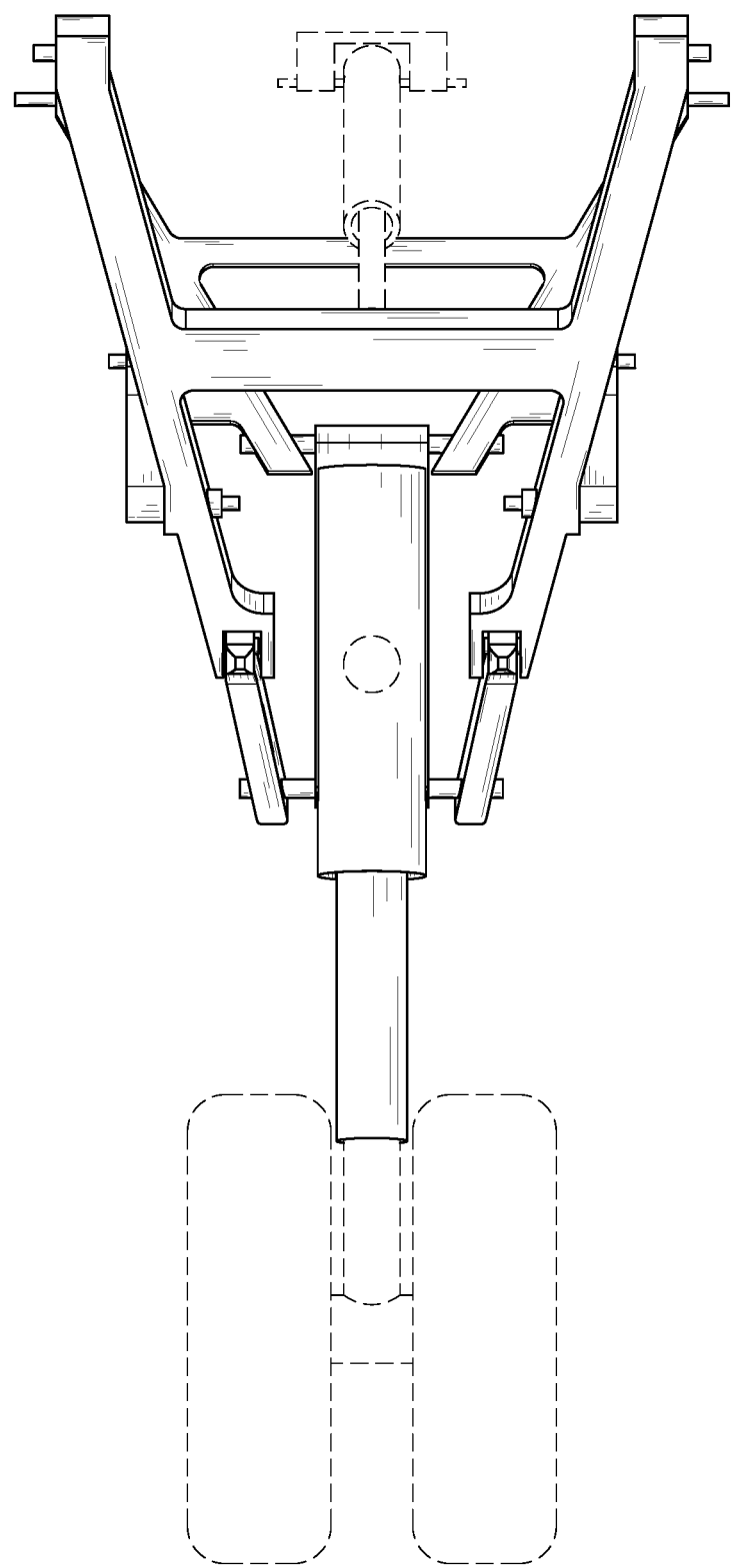
FIG. 17 is a right side view of the nose landing gear assembly shown in FIG. 16 in the extended position, and the left side view is a mirror image of the right side view.
Figure 18:
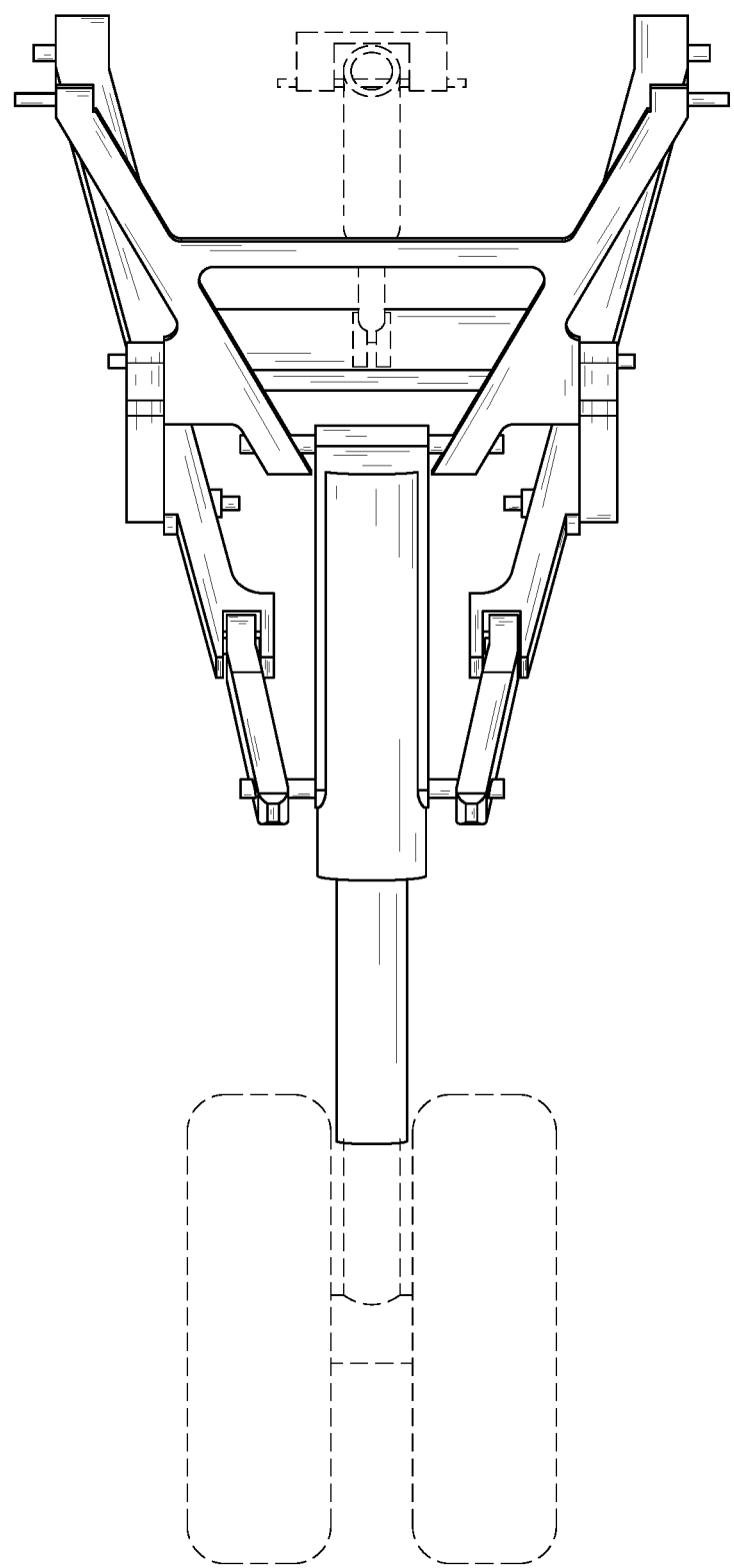
FIG. 18 is a front view of the nose landing gear assembly shown in FIG. 16 in the extended position.
Figure 19:
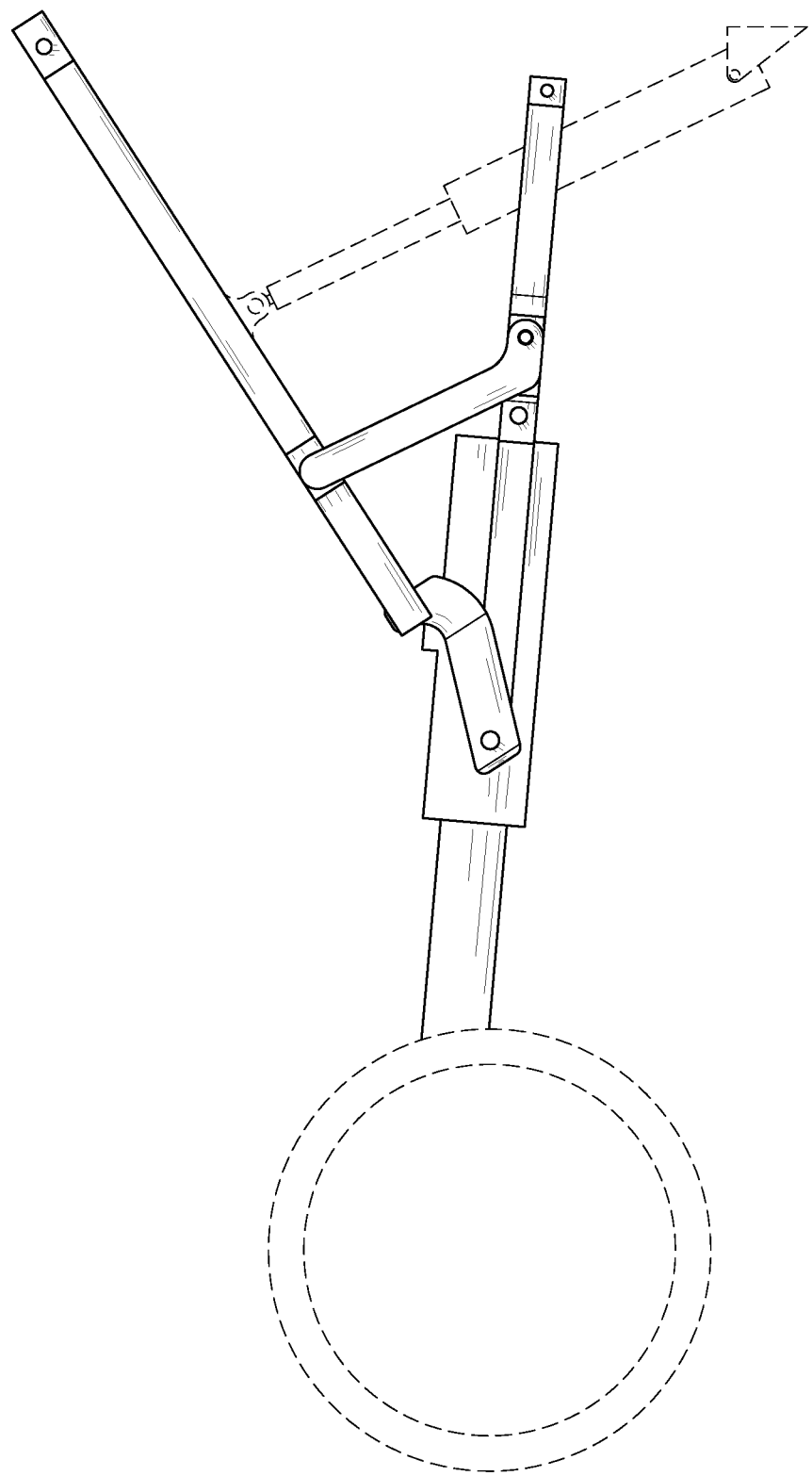
FIG. 19 is a rear view of the nose landing gear assembly shown in FIG. 16 in the extended position.
Figure 20:
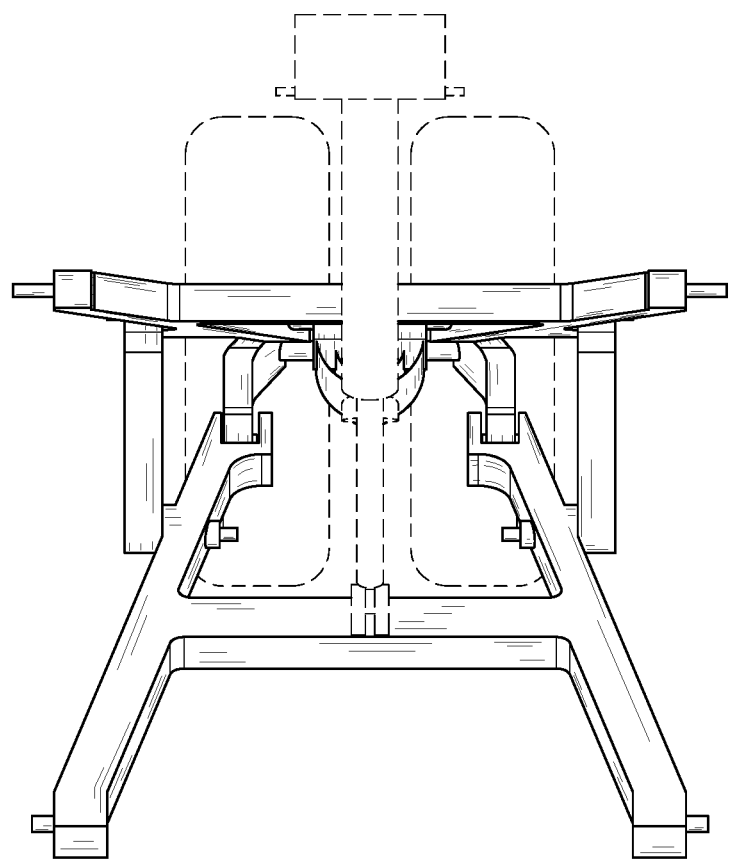
FIG. 20 is a top view of the nose landing gear assembly shown in FIG. 16 in the extended position.
Figure 21:
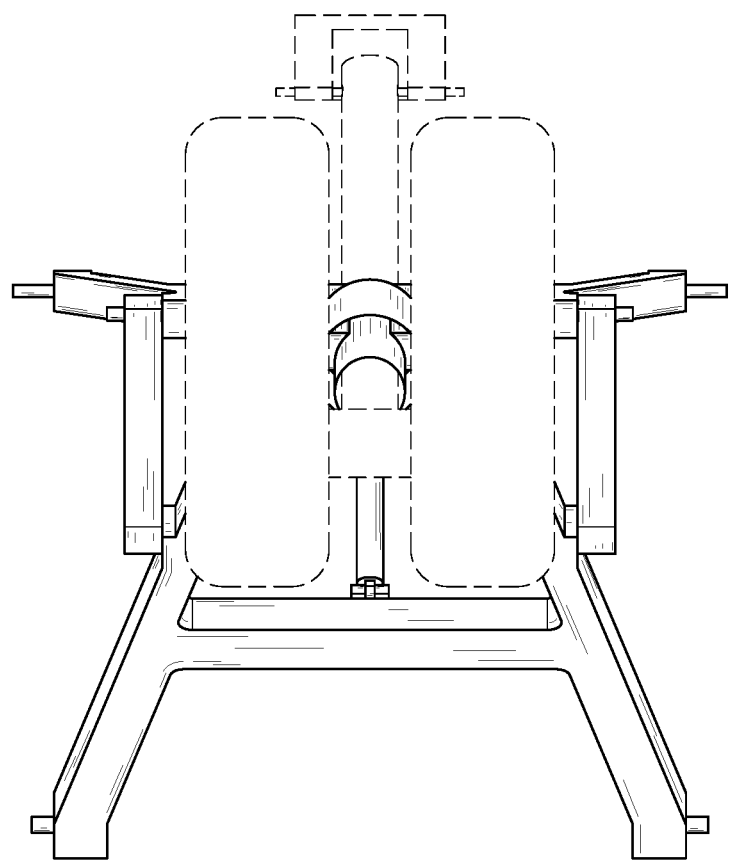
FIG. 21 is a bottom view of the nose landing gear assembly shown in FIG. 16 in the extended position.
Figure 22:
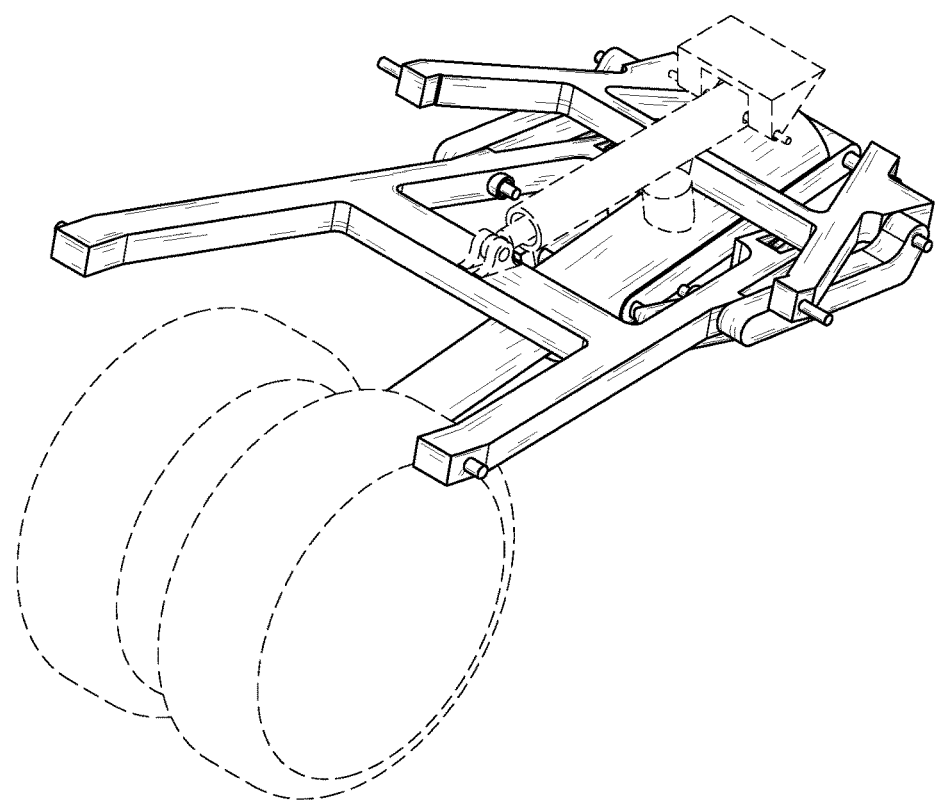
FIG. 22 is front perspective view of the nose landing gear assembly shown in FIG. 16 in a retracted position.
Figure 23:
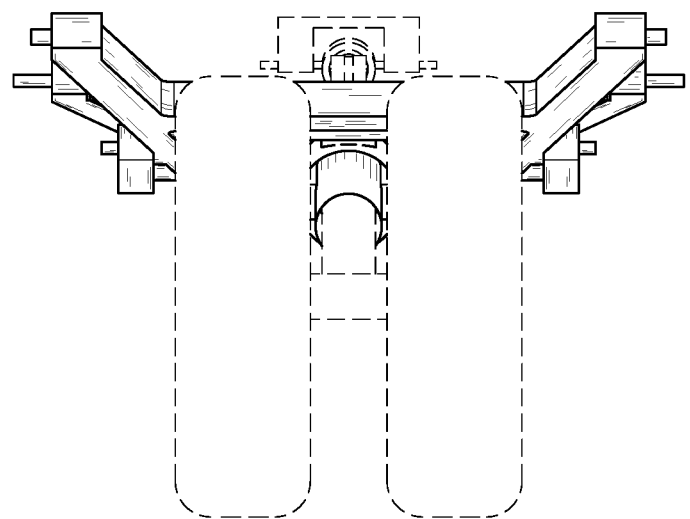
FIG. 23 is a right side view of the nose landing gear assembly shown in FIG. 16 in the retracted position, and the left side view is a mirror image of the right side view.
Figure 24:
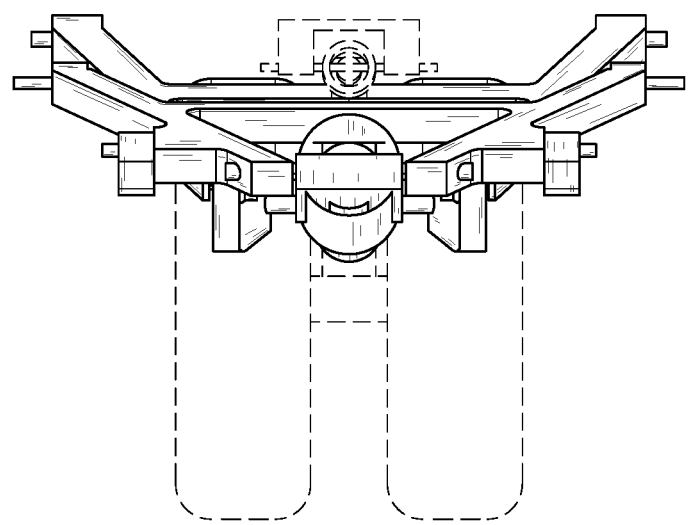
FIG. 24 is a front view of the nose landing gear assembly shown in FIG. 16 in the retracted position.
Figure 25:
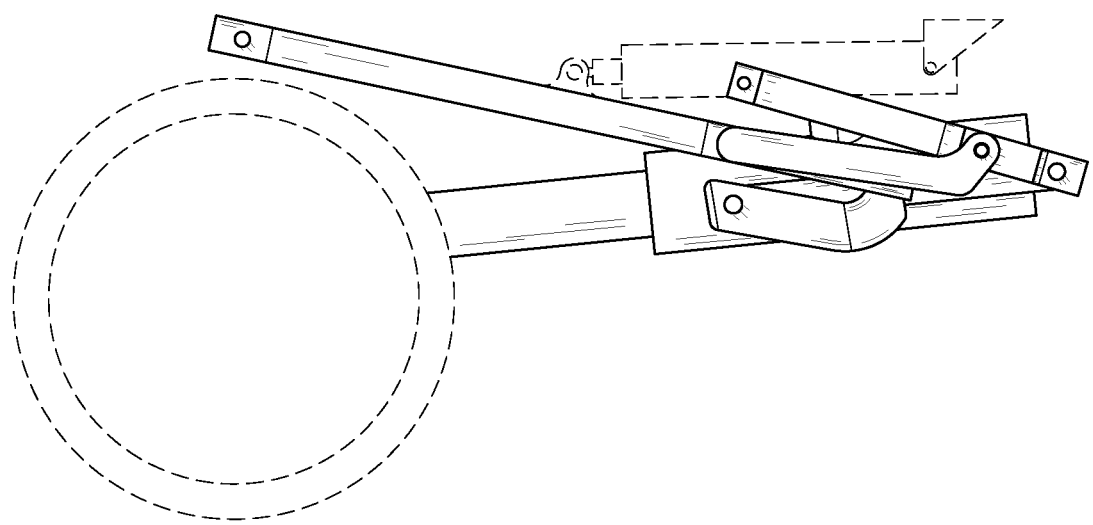
FIG. 25 is a rear view of the nose landing gear assembly shown in FIG. 16 in the retracted position.
Figure 26:
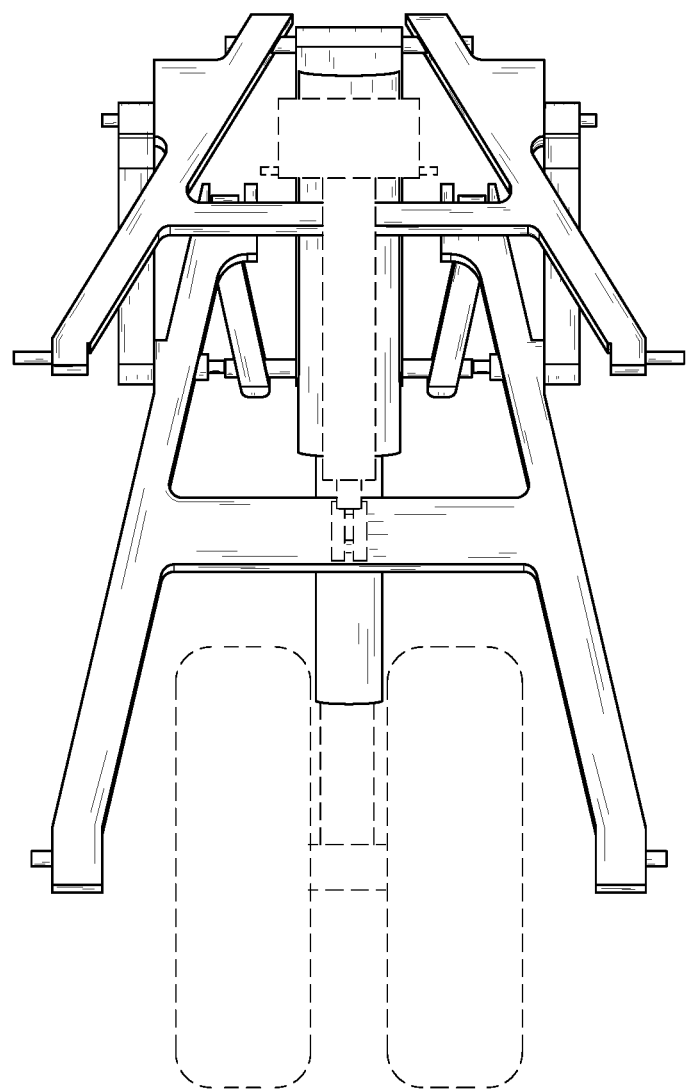
FIG. 26 is a top view of the nose landing gear assembly shown in FIG. 16 in the retracted position.
Figure 27:
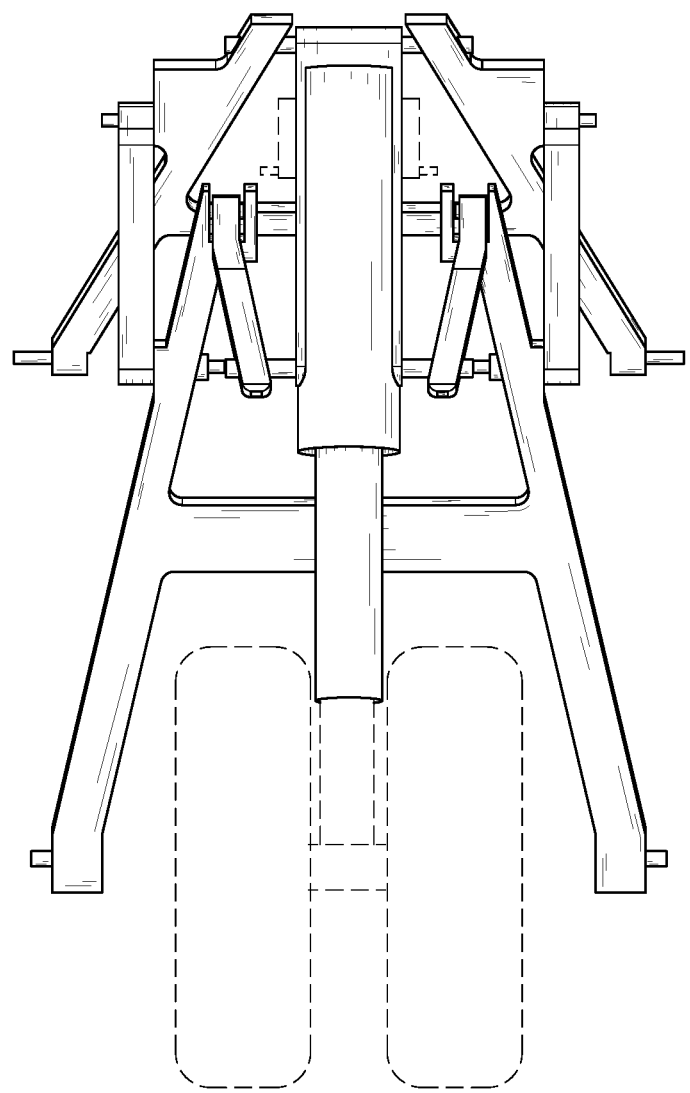
FIG. 27 is a bottom view of the nose landing gear assembly shown in FIG. 16 in the retracted position.

FIG. 10 is a side view of nose landing gear assembly 108 in the retracted position; FIG. 11 is a perspective view of nose landing gear assembly 108 in the retracted position; and FIG. 12 a front view of nose landing gear assembly 108 in the retracted position. FIG. 13 is a rear view of the nose landing gear assembly 108 in the retracted position, FIG. 14 is a top view of the nose landing gear assembly 108 in the retracted position, and FIG. 15 is a bottom view of the nose landing gear assembly 108 in the retracted position.

As best shown in FIG. 10, when nose gear assembly 108 is in the retracted position, first end 120 of aft brace 118, first end 164 of side links 162, and first end 146 of lower links 144 are all substantially vertically aligned. Furthermore, forward brace 110, aft brace 118, oleo strut 136, actuator 126, side links 162, and lower links 144 at least partially overlap in the vertical direction when in the retracted position. Additionally, in the retracted position, actuator 126 is substantially horizontal.

In the exemplary embodiment, nose gear assembly 108 defines a first vertical height H1 (shown in FIG. 3) in the extended position of between, inclusively, approximately 80.0 inches and approximately 84.0 inches. Specifically, in one embodiment, nose gear assembly 108 defines a first vertical height H1 in the extended position of approximately 80.0 inches. Similarly, nose gear assembly 108 defines a second vertical height H2 (shown in FIG. 10) in the retracted position of between, inclusively, approximately 28.0 inches and approximately 32.0 inches. Specifically, in one embodiment, nose gear assembly 108 defines a first second vertical height H2 in the extended position of approximately 30.0 inches. As such, first vertical height H1 is greater than second vertical height H2. Specifically, in one exemplary embodiment, second vertical height H2 is between, inclusively, approximately 34% and approximately 38% of the first vertical height H1. More specifically, second vertical height H2 is approximately 36.5% of the first vertical height H1. The relatively small compacted height of nose gear assembly 108 in the retracted position as compared to nose gear assembly 108 in the extended position allows nose gear assembly 108 to fit within a smaller volume nose gear bay 106 to allow for a maximum amount of cargo volume in aircraft 100.

Similarly, as best shown in FIG. 3, first pivot axis 116 is positioned a third height H3 of between, inclusively, approximately 75.0 inches and approximately 81.0 inches above the ground surface when nose landing gear assembly 108 is in the extended position. More specifically, in one embodiment, first pivot axis 116 is positioned a third height H3 of approximately 78.0 inches above the ground surface. A relatively smaller ground clearance between first pivot axis 116 and the ground surface allows for a larger cargo bay 102.

Furthermore, as shown in FIG. 1, gear bay includes a forward end 103 and an aft end 105. In one embodiment, forward end 103 includes a height H4 of between, inclusively, approximately 33.0 inches and approximately 36.0 inches. More specifically, forward end 103 includes a height H4 of approximately 34.5.0 inches. Similarly, aft end 105 includes a height H5 of between, inclusively, approximately 36.0 inches and approximately 40.0 inches. More specifically, aft end 105 includes a height H5 of approximately 38.0 inches. In such a configuration, nose gear bay 106 includes a volume of between, inclusively, 70,000 cubic inches and approximately 75,000 cubic inches. More specifically, in one embodiment, nose gear bay 106 includes a volume of approximately 72,626 cubic inches. The relatively smaller volume nose gear bay 106 requires that nose gear assembly 108 folds sufficiently to fit within nose gear bay 106. As described herein, aircraft 100 provides limited volume beneath cargo bay floor 104 to store nose gear assembly 108 to allow for a large volume cargo bay 102.

The implementations described herein relate to nose-mounted landing gear for an aircraft, and more specifically to a compact nose-mounded landing gear housed in a reduced-volume gear bay. More specifically, in the exemplary implementation, nose-mounted landing gear assembly includes an oleo strut, a forward brace including a forward brace first end and a forward brace second end. The forward brace first end is pivotably coupled to the nose gear bay of a high wing aircraft about a first pivot axis. The nose-mounted landing gear assembly also includes an aft brace having an aft brace first end and an aft brace second end. The aft brace first end is pivotably coupled to the nose gear bay about a second pivot axis, and the aft brace second end is pivotably coupled to the oleo strut. An actuator includes an actuator first end and an actuator second end. The actuator second end is coupled to the nose gear bay and the actuator first end coupled to the forward brace. The actuator is configured to move the nose landing gear assembly between a retracted position and an extended position.

The assemblies and methods described herein facilitate folding a nose gear assembly into a more compact configuration in order to allow storage in a reduced volume nose gear bay. Generally, the nose gear assembly described herein is for use with a cargo aircraft having no passenger compartment and an enlarged cargo bay. In such an aircraft, the cargo bay floor is positioned in as close proximity to the bottom of the aircraft as possible to enable a maximum amount of cargo storage. As such, the available volume for the storage of the nose landing gear assembly is reduced. The nose landing gear assembly described herein allows for a retracted configuration that occupies only a small percentage of the space required when in the extended configuration, and so is able to be stored in a relatively smaller nose gear bay volume. As a result, the cargo bay is made to be larger than known cargo aircraft to enable the transport of a larger volume of cargo.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and preceded by the word "a" or "an" should be understood as not excluding plural elements or steps unless such exclusion is explicitly recited. Furthermore, references to "one embodiment" of the present invention or the "example embodiment" are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A nose landing gear assembly for use with a high wing aircraft that defines a nose gear bay, the nose landing gear assembly comprising:
   an oleo strut;
   a forward brace comprising a forward brace first end and a forward brace second end, the forward brace first end pivotably coupled to the nose gear bay about a first pivot axis, wherein the forward brace comprises a forward brace first leg, a forward brace second leg, and a forward brace crossbeam extending therebetween;
   an aft brace comprising an aft brace first end and an aft brace second end, the aft brace first end pivotably coupled to the nose gear bay about a second pivot axis, and the aft brace second end pivotably coupled to the oleo strut, wherein the aft brace comprises an aft brace first leg, an aft brace second leg, and an aft brace crossbeam extending therebetween; and
   an actuator comprising an actuator first end and an actuator second end, the actuator second end coupled to the nose gear bay and the actuator first end coupled to the forward brace, wherein the actuator is configured to selectively move the nose landing gear assembly between, inclusively, a retracted position and an extended position.

2. The nose landing gear assembly in accordance with claim 1, wherein the actuator extends between the aft brace first leg and the aft brace second leg.

3. The nose landing gear assembly in accordance with claim 1, wherein the first pivot axis and the second pivot axis are vertically offset by a distance of 1.50 inches and 3.50 inches.

4. The nose landing gear assembly in accordance with claim 1, wherein the nose landing gear assembly defines a first vertical height in the extended position and a second vertical height in the retracted position, wherein the second vertical height is 34% to 38% the first vertical height.

5. The nose landing gear assembly in accordance with claim 1 further comprising a pair of side links coupled between the forward brace and the aft brace.

6. The nose landing gear assembly in accordance with claim 5, wherein each side link of the pair of side links comprise a side link first end coupled to the forward brace between the forward brace crossbeam and the forward brace second end, and wherein each side link of the side links comprise a side link second end coupled to the aft brace between the aft brace crossbeam and the aft brace second end.

7. The nose landing gear assembly in accordance with claim 1, wherein the actuator first end is coupled to the forward brace crossbeam.

8. The nose landing gear assembly in accordance with claim 7, wherein the forward brace second leg is obliquely oriented with respect to the forward brace first leg.

9. The nose landing gear assembly in accordance with claim 7, wherein the forward brace crossbeam is positioned midway between the forward brace first end and the forward brace second end.

10. An aircraft comprising:
   a cargo bay comprising a cargo bay floor;
   a nose gear bay positioned below the cargo bay floor; and
   a nose landing gear assembly selectively positioned within the nose gear bay, the nose landing gear assembly comprising:
      an oleo strut;
      a forward brace comprising a forward brace first end and a forward brace second end, the forward brace first end pivotably coupled to the nose gear bay about a first pivot axis, wherein the forward brace comprises a forward brace first leg, a forward brace second leg, and a forward brace crossbeam extending therebetween;
      an aft brace comprising an aft brace first end and an aft brace second end, the aft brace first end pivotably coupled to the nose gear bay about a second pivot axis, and the aft brace second end pivotably coupled to the oleo strut, wherein the aft brace comprises an aft brace first leg, an aft brace second leg, and an aft brace crossbeam extending therebetween; and
      an actuator comprising an actuator first end and an actuator second end, the actuator second end coupled to the nose gear bay and the actuator first end coupled to the forward brace, wherein the actuator is configured to selectively move the nose landing gear assembly between, inclusively, a retracted position and an extended position, wherein the actuator first end is coupled to the forward brace crossbeam.

11. The aircraft in accordance with claim 10, wherein the forward brace includes a forward brace width that is tapered from the forward brace first end to the forward brace second end, and wherein the aft brace includes an aft brace width that is tapered from the aft brace first end to the aft brace second end.

12. The aircraft in accordance with claim 10, wherein the forward brace, the aft brace, the oleo strut, and the actuator at least partially overlap in a vertical direction when in the retracted position.

13. The aircraft in accordance with claim 10, wherein the first pivot axis is positioned 75.0 inches to 81.0 inches above a ground surface when the nose landing gear assembly is in the extended position.

14. The aircraft in accordance with claim 10, wherein the nose gear bay comprises a height of 33.0 inches to 36.0 inches.

15. The aircraft in accordance with claim 10, wherein the nose landing gear assembly defines a first vertical height in the extended position and a second vertical height in the retracted position, wherein the second vertical height is 34% to 38% the first vertical height.

16. The aircraft in accordance with claim 10, further comprising a pair of side links coupled between the forward brace and the aft brace.

17. A method of assembling a nose gear assembly for use with a high wing aircraft that defines a nose gear bay, wherein the nose gear assembly includes an oleo strut, a forward brace, an aft brace, and an actuator, the method comprising:
   pivotably coupling a first end of the forward brace to the nose gear bay about a first pivot axis;
   pivotably coupling a first end of the aft brace to the nose gear bay about a second pivot axis;
   pivotably coupling a second end of the aft brace to the oleo strut; coupling a first end of the actuator to the nose gear bay;
   coupling a second end of the actuator to the forward brace, wherein the actuator is configured to selectively move the nose gear assembly between, inclusively, a retracted position and an extended position;
   coupling a pair of side links between the forward brace and the aft brace; and
   coupling a pair of lower links between a second end of the forward brace and the oleo strut.

* * * * *